(12) United States Patent
Cho et al.

(10) Patent No.: US 7,649,527 B2
(45) Date of Patent: Jan. 19, 2010

(54) IMAGE DISPLAY SYSTEM WITH LIGHT PEN

(75) Inventors: Jong-Whan Cho, Gunpo-si (KR);
Sang-Jin Park, Yongin-si (KR);
Jong-Woung Park, Seongnam-si (KR);
Myung-Woo Lee, Suwon-si (KR);
Kee-Han Uh, Yongin-si (KR);
Hyung-Guel Kim, Yongin-si (KR);
Young-Jun Choi, Yongin-si (KR);
Young-Bae Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 531 days.

(21) Appl. No.: 10/846,043

(22) Filed: May 14, 2004

(65) Prior Publication Data
US 2005/0052435 A1   Mar. 10, 2005

(30) Foreign Application Priority Data

| Sep. 8, 2003 | (KR) | ...................... 10-2003-0062501 |
| Nov. 5, 2003 | (KR) | ...................... 10-2003-0078088 |
| Nov. 6, 2003 | (KR) | ...................... 10-2003-0078172 |

(51) Int. Cl.
*G09G 3/28* (2006.01)
*G06F 3/042* (2006.01)

(52) U.S. Cl. ..................................... 345/182; 345/175

(58) Field of Classification Search ......... 345/179–183, 345/207, 81, 104
See application file for complete search history.

(56) References Cited

U.S. PATENT DOCUMENTS

| 4,677,428 | A | * | 6/1987 | Bartholow ................... 345/180 |
| 5,430,462 | A |   | 7/1995 | Katagiri et al. |
| 5,838,308 | A | * | 11/1998 | Knapp et al. ................. 345/173 |
| 6,339,748 | B1 | * | 1/2002 | Hiramatsu .................... 702/159 |
| 6,995,743 | B2 | * | 2/2006 | Boer et al. .................... 345/104 |
| 7,006,080 | B2 | * | 2/2006 | Gettemy ....................... 345/175 |
| 7,379,139 | B2 | * | 5/2008 | Yamazaki ..................... 349/116 |
| 2002/0075424 | A1 | * | 6/2002 | Sakamoto et al. .............. 349/43 |
| 2003/0030923 | A1 | * | 2/2003 | Hsu et al. ..................... 359/857 |
| 2003/0156100 | A1 |   | 8/2003 | Gettemy |
| 2004/0001052 | A1 | * | 1/2004 | Zank ........................... 345/179 |

FOREIGN PATENT DOCUMENTS

CN   1175344/1233795 C   10/2004

OTHER PUBLICATIONS

U.S. Appl. No. 09/997,532, referenced in Gettemy US 7,006,080.*

* cited by examiner

*Primary Examiner*—Amr Awad
*Assistant Examiner*—Randal Willis
(74) *Attorney, Agent, or Firm*—Cantor Colburn LLP

(57) ABSTRACT

An image display system includes a light pen to generate light to input data, and a display panel to display images in response to the light provided from the light pen. The display panel includes a first substrate on which pixel electrodes are formed, a second substrate on which a common electrode are formed, and a photo-sensor formed on the first substrate. The photo-sensor detects the light provided from the light pen to generate a light detect signal. The image display system also includes a driving module to provide new image data to the display panel to display new images in response to the light detect signal from the photo-sensor.

29 Claims, 25 Drawing Sheets

IMAGE DISPLAY SYSTEM WITH LIGHT PEN

BACKGROUND OF THE INVENTION

1. Field of the Invention

The present invention relates to a system for displaying images, and more particularly, to an image display system having a light pen to input information.

2. Description of the Related Art

Generally, conventional image display devices have such a data interface function that electrical data provided from an image data processing device is converted into images. In the conventional image display devices, the electrical data from the image data processing device is externally inputted using various input devices, such as a keyboard, a key pad, a mouse, etc.

Recently developed display devices have a screen which is capable of receiving input data, and the input data is processed to display the processed data on the screen. In other words, a display device and an input device are unified in such display devices.

To configure a display system having the unified display device and the input device, the display device includes a touch screen panel. When a specific position on the touch screen panel is compressed, location information of the specific position is transferred to an information processing device. Then, the information processing device processes the location information to output a new image signal. The display device then displays a new image using the new image signal.

However, the touch screen panel increases weight and volume of the display device. Further, when an image or a picture to be displayed on the touch screen is minute, the touch screen panel is inappropriate.

More recently, there have been developments of display devices having capability of sensing light provided form an external input device to detect the location in which the light is entered into a display device. Such display devices have a light detect sensor, which detects the entered light and outputs a signal containing location information, as well as pixels for displaying images. The signal is transferred to the information processing device which then processes the signal to display image(s) corresponding to the location information.

Generally, a light pen is used to generate the light to be inputted onto the display device. The light pen includes a light source generating light of high luminance. A light emitting diode is generally used for the light source. The light emitting diode is disposed at an end portion of the light pen.

In such conventional display systems, the light pen generates white light which is then filtered by a color filter to form a single colored light. Such process decreases the amount of the light. Additionally, the single colored light passes through a liquid crystal layer, an indium tin oxide layer (or indium zinc oxide layer), an organic layer, etc. Thus, the amount of the light is more decreased. As a result, the light detect sensor may malfunction due to the decrease in the amount of the light provided to the light detect sensor. Further, the light pen includes the light source, such as a light emitting diode, to generate the light, it is inevitable to cause an increase in its weight and volume and manufacturing cost.

Therefore, a need exists for an image display system in which the amount light provided from a light pen is not or little decreased so that the light detect sensor operates properly and accurately. Further, it will be advantageous to provide an image display system in which the light detect sensor is disposed within a display panel of the display system so that there is no need of a touch screen panel. It is also further desirable to provide a light pen for the display system which provides light to the light detect sensor without a light source.

SUMMARY OF THE INVENTION

The above mentioned and other drawbacks and deficiencies of the prior art are overcome or alleviated by an image display system of the present invention. In one embodiment, an image display system includes a display panel having a first substrate on which first electrodes are formed, a second substrate on which a second electrode is formed, and a liquid crystal layer disposed between the first and second substrates, optical properties of the liquid crystal layer varying in association with changes of electric field formed between the first and second electrodes, and a data input device interfacing with the display panel using light, the data input device including a light converting part that receives image light provided from the display panel and converts the image light into first sensing light that is detected by the display panel. The data input device includes a light converting part disposed at a selected portion of the body, which receives image light provided from the display panel and converting the image light into first sensing light that is detected by the display panel. The data input device may also include a detector to detect an amount of the image light arriving at the light converting part, in which the detector generates a detect signal in response to the detected amount of the light, and a light generating module to generate second sensing light in response to the detect signal provided from the detector, wherein the light converting part provides the first and second sensing light to the display panel.

In one aspect of the invention, the display panel includes a light sensing part to detect the sensing light provided from the data input device to generate a light detect signal, in which the light sensing part is disposed on the first substrate and between the first electrodes. The light sensing part includes a photo-sensor electrically connected with sensor lines of the display panel to detect the sensing light to generate the light detect signal to one of the sensor lines. The display panel may include a first transmission region formed on the second substrate, which has color filters to transmit color light, a second transmission region formed on the second substrate, which is transparent to transmit white light, and the light sensing part disposed on the first substrate at a location corresponding to the second transmission region, in which the light sensing part detects the sensing light provided from the data input device through the second transmission region.

In another aspect of the present invention, the display panel includes an organic layer disposed between the first electrodes and the first substrate, in which the organic layer has openings each formed at a location corresponding to the light sensing part, so that the sensing light is provided to the light sensing part through the openings. The first electrodes each include a metal electrode having openings through which the sensing light passes.

In another aspect of the present invention, the display panel includes a color filter layer formed between the second substrate and the second electrode, in which the color filter layer has a light inflow part through which the sensing light passes. The light inflow part is disposed at a location corresponding to the light sensing part, so that the first sending light is provided to the light sensing part through the light inflow part.

These and other objects, features and advantages of the present invention will become apparent from the following detailed description of illustrative embodiments thereof, which is to be read in connection with the accompanying drawings.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
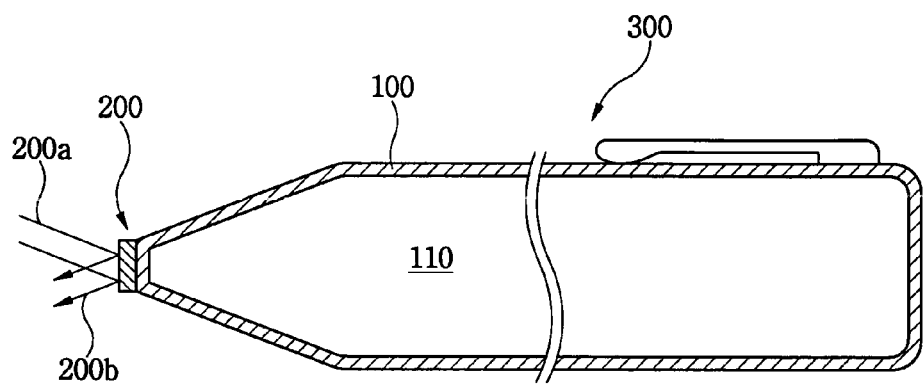
FIG. 1 is a cross-sectional view of a light pen according to an exemplary embodiment of the present invention.

FIG. 1 is a cross-sectional view of a light pen according to an exemplary embodiment of the present invention. Referring to FIG. 1, the light pen 300 includes a body 100 and a light converting part 200. The light converting part 200 is disposed at the end portion of the body 100, and has, for example, a disc shape. The body 100 is narrowed to form the end portion of the body 100. The light converting part 200 converts image light 200a into a first sensing light 200b. The image light 200a is generated from a display device (not shown) and advances toward the light converting part 200. The image light 200a is then reflected by the light converting part 200, and the reflected light is provided as the first sensing light 200b, which advances from the light converting part 200 toward the display device. For example, the light converting part 200 reflects a portion of the image light 200a to provide the first sensing light 200b, and the first sensing light 200b has a traveling direction different from that of the image light 200a. The light converting part 200 is made of material having metal, such as aluminum, aluminum alloy, etc., which has good reflectivity.

The body 100 may have various shapes according to user's preference. In this embodiment, the body 100 has a pen shape. The light converting part 200 is fixed at the end portion of the body 100. For example, the body 100 has a hollow space 110, so that the body 100 is very light.

Figure 2:
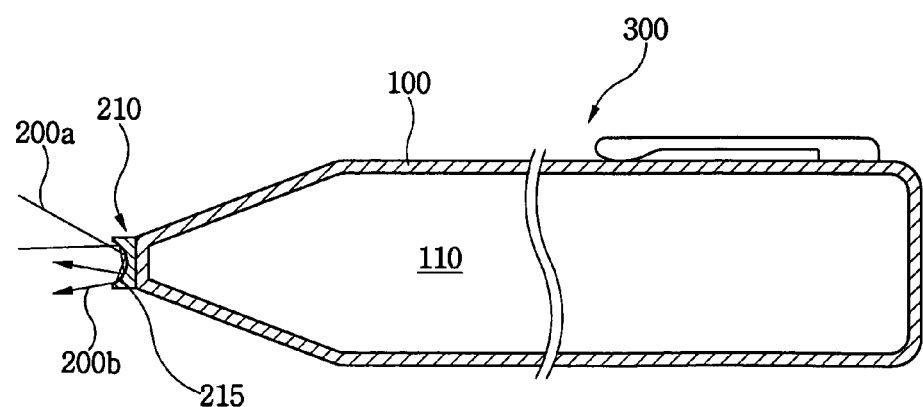
FIG. 2 is a cross-sectional view of a light pen according to another exemplary embodiment of the present invention.

FIG. 2 is a cross-sectional view of a light pen according to another exemplary embodiment of the present invention. In FIG. 2, the same parts as those shown in FIG. 1 are represented with like reference numerals and, their explanation will be omitted to avoid description duplication.

Referring to FIG. 2, the light pen 300 includes a light converting part 210 disposed at the end portion of the body 100. The light converting part 210 has a disc shape with a recession 215. Thus, when the light converting part 210 reflects the image light 200a to provide the first sensing light 200b, the recession 215 condenses the reflected light to form the first sensing light 200b. As a result, the first sensing light 200b is focused on a small region.

The light converting part 210 is made of material including, for example, aluminum, aluminum alloy, etc. The light converting part 210 may also be made of material having plastic and it is covered (or coated) with a metal film.

Figure 3:
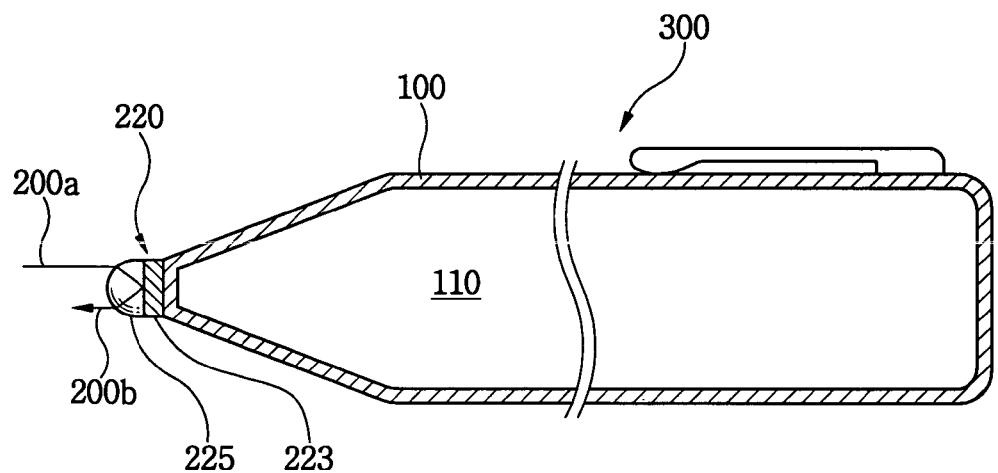
FIG. 3 is a cross-sectional view of a light pen according to another exemplary embodiment of the present invention.

FIG. 3 is a cross-sectional view of a light pen according to another exemplary embodiment of the present invention. In FIG. 3, the same parts as those shown in FIG. 1 are represented with like reference numerals and, their explanation will be omitted to avoid description duplication.

Referring to FIG. 3, the light converting part 220 includes a base 223 and a scratch preventing part 225. In this embodiment, the base 223 has a disc shape, and the scratch preventing part 225 is formed on a surface of the base 223. The surface on which the scratch preventing part 225 is formed is opposite to the surface of the base 223 in contact with the end portion of the body 100. The scratch preventing part 225 protects a display device from being damaged by the light pen 300. In other words, a surface of the display device that makes contact with the light pen 300 is prevented from being scratched by the light converting part 220. Also, the scratch preventing part 225 protects the light converting part 220.

For example, the scratch preventing part 225 has a hemispherical shape. The scratch preventing part 225 is disposed on the surface of the base 223 of the light converting part 220 and processed to be rounded. In another example, the scratch preventing part 225 is prepared to have a hemispherical shape and then attached on the surface of the base 223.

Figure 4:
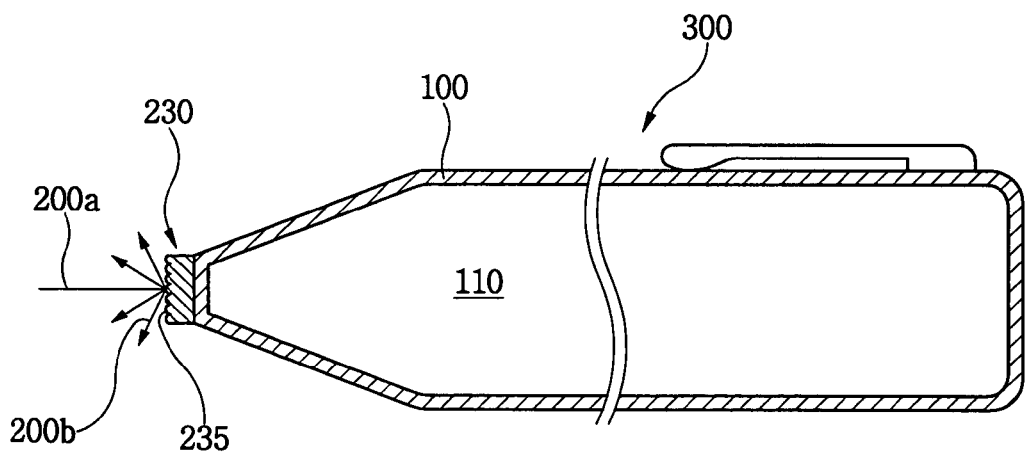
FIG. 4 is a cross-sectional view of a light pen according to another exemplary embodiment of the present invention.

FIG. 4 is a cross-sectional view of a light pen according to another exemplary embodiment of the present invention. In FIG. 4, the same parts as those shown in FIG. 1 are represented with like reference numerals and, their explanation will be omitted to avoid description duplication.

Referring to FIG. 4, the light pen 300 includes a light converting part 230 at its end portion, and the light converting part 230 includes a diffused reflection part 235 is formed on a light converting part 230. The light converting part 230 having the diffused reflection part 235 to diffusively reflect the light provided thereto. The image light 200a provided from a display device is diffusively reflected by the diffused reflection part 235 to form the first sensing light 200b.

In this embodiment, the diffused reflection part 235 has an embossed pattern to diffuse the image light 200a. The diffused reflection part 235 reflects and diffuses the image light 200a to form the first sensing light 200b. Thus, even when the light pen 300 is not accurately pointing out an objective article, the display device detects the first sensing light 200b.

Figure 5:
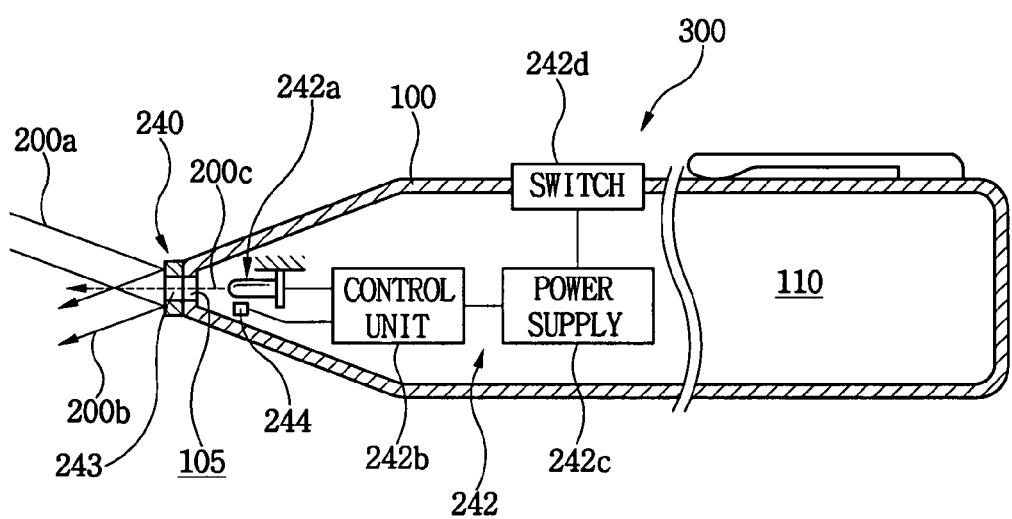
FIG. 5 is a cross-sectional view of a light pen according to another exemplary embodiment of the present invention.

FIG. 5 is a cross-sectional view of a light pen according to another exemplary embodiment of the present invention. In FIG. 5, the same parts as those shown in FIG. 1 are represented with like reference numerals and, their explanation will be omitted to avoid description duplication.

Referring to FIG. 5, the light pen 300 includes a light converting part 240 disposed at the end portion of the body 100 and a light generating module 242 and a detector 244 disposed within the body 100. The body 100 has the hollow space 110 receiving the light generating module 242 which includes a light source 242a, a control unit 242b, a power supply 242c, and a switch 242d.

The light converting part 240 reflects the image light 200a to provide the first sensing light. As the embodiments of FIGS. 1 to 4, the light converting part 240 reflects a portion of the image light 200a.

In the body 100 of the light pen 300, the detector 244 detects the image light 200a provided from a display device and generates a light detect signal to the control unit. The light detect signal may be in a digital format and is associated with the amount of the image light 200a detected by the detector 244. The detector is implemented with, for example, a phototransistor or a photodiode.

The control unit 242b of the light generating module 242 provides a control signal to the power supply 242c in response to the light detect signal from the detector 244. The control unit 242b compares the light detect signal from the detector 244 with reference data that are previously stored. When the amount of the image light 200a is smaller than the reference data, the control unit 242b controls the power supply 242c to provide power to the light source 242a. Then, the light source 242a generates a second sensing light 200c to the display device. The amount of the second sensing light 200c varies in association with the amount of the first sensing light 200a detected by the detector 244. For example, the amount of the second sensing light 200c varies in reverse proportion to the amount of the image light 200a detected by the detector 244. Since the amount of the first sensing light 200b is small when that of the image light 200a is small, the total amount of the light provided to the display device from the light pen 300 is enhanced by providing or increasing the amount of the second sensing light 200c in addition to the first sensing light 200b.

The body 100 includes an opening 105 through which the second sensing light 200c travels toward the display device. In this embodiment, the light converting part 240 includes a hole 243 formed in alignment with the opening 105 of the body 100, so that the second sensing light 200c generated from the light source 242a travels through the opening 105 and the hole 243 toward the display device.

In this embodiment, the light source 244 is implemented with a light emitting diode which is turned on or off by the control unit 242b. The switch 242d disposed in the body 100 such that its switching lever (not shown) is exposed outside the body so as to be turned on or off by a user. The switch 242d turns on or off the light generating module 242. The light pen 300 of this embodiment may be used more effectively in a normally black mode liquid crystal display device.

Figure 6:
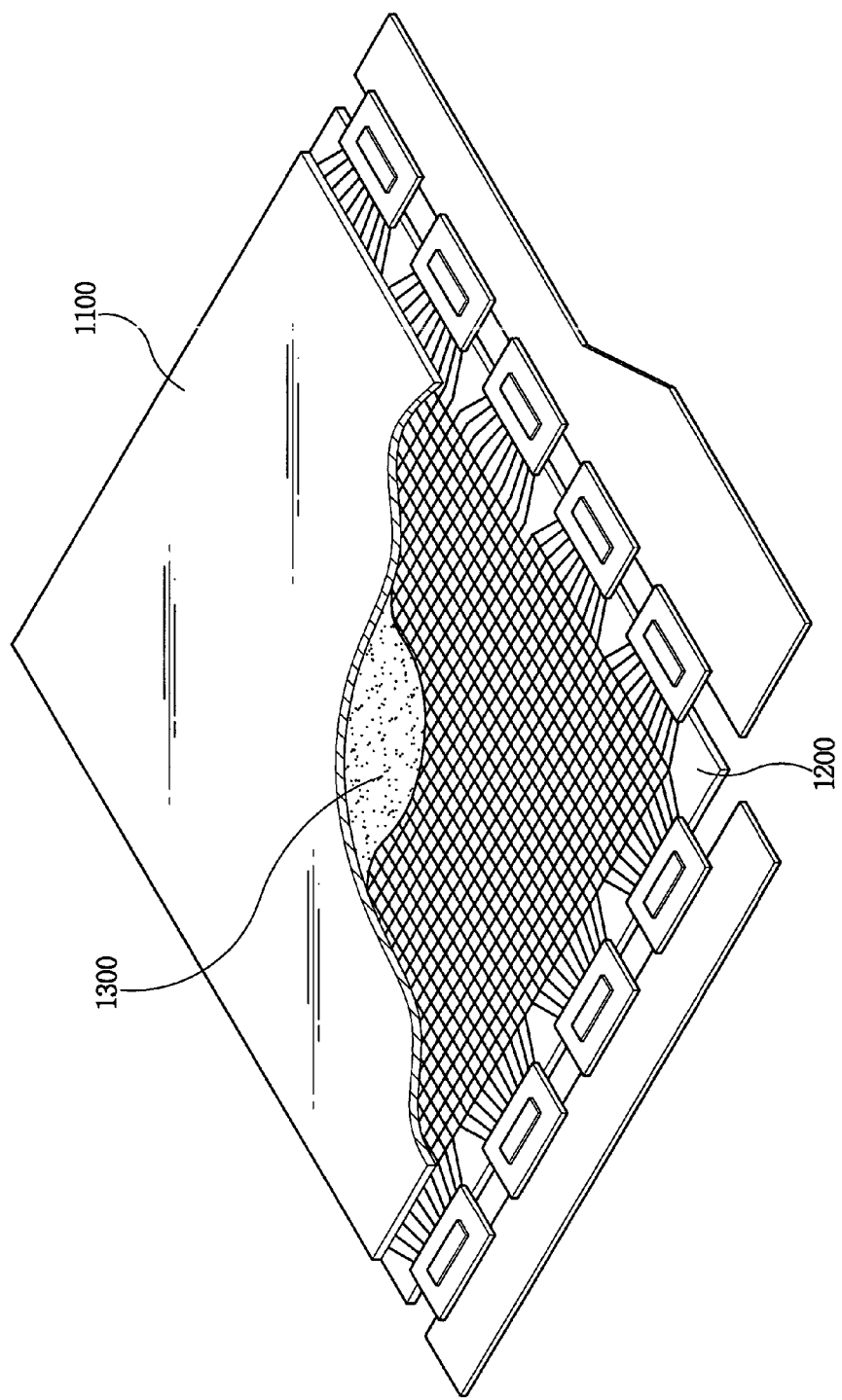
FIG. 6 is a partially cutout perspective view showing a display device according to an exemplary embodiment of the present invention.
Figure 7:
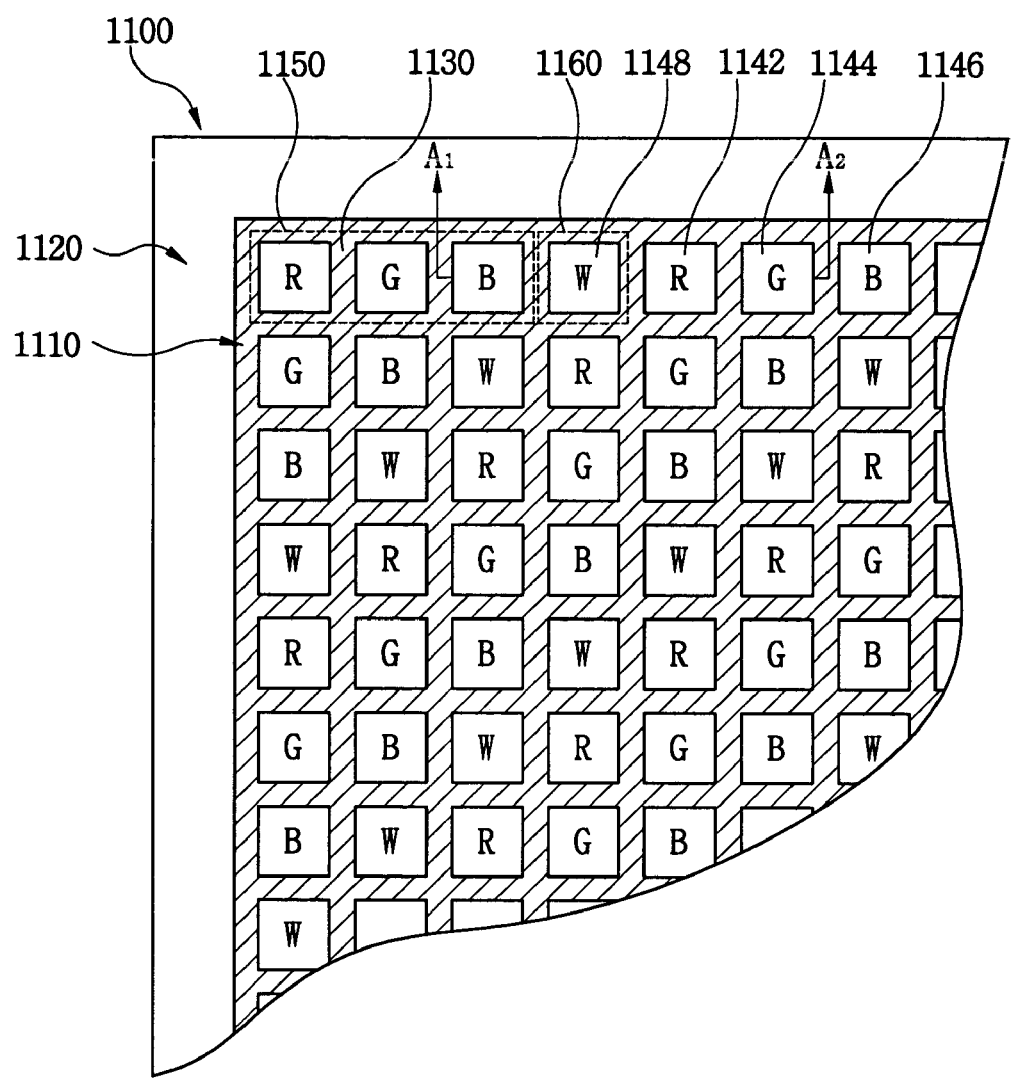
FIG. 7 is a schematic plan view showing the first substrate in FIG. 6.

FIG. 6 is a partially cutout perspective view showing a display device according to an exemplary embodiment of the present invention. FIG. 7 is a schematic plan view showing the first substrate in FIG. 6, and FIG. 8 is a cross-sectional view of the first substrate taken along line $A_1$-$A_2$ in FIG. 7.

Figure 8:
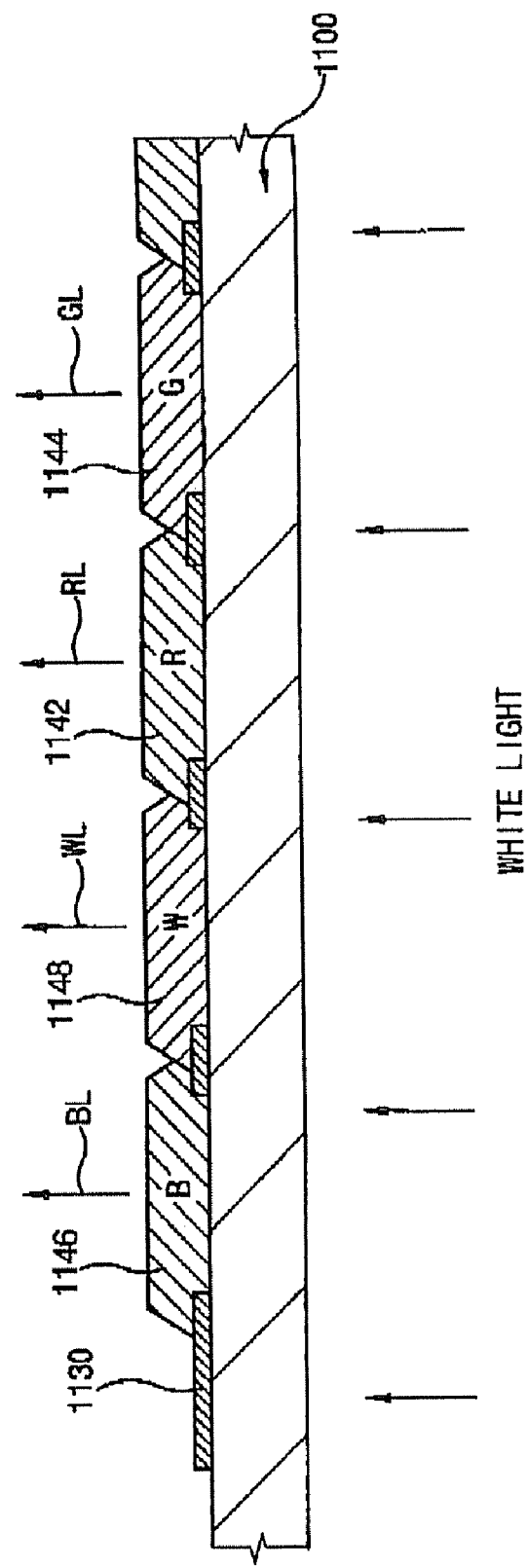
FIG. 8 is a cross-sectional view of the first substrate taken along line $A_1$-$A_2$ in FIG. 7.

Referring to FIGS. 6 to 8, the display device includes a first substrate 1100, a second substrate 1200, a liquid crystal layer 1300 disposed between the first and second substrates 1100 and 1200. The first substrate 1100 is implemented with, for example, a transparent glass substrate. The first substrate 1100 includes a first effective display region 1110 and a first non-effective display region 1120. The first non-effective display region 1120 surrounds the first effective display region 1110.

A black matrix 1130 is disposed in the first effective display region 1110. The black matrix 1130 has a frame shape. A metal layer, for example chromium (Cr) layer, a chromium oxide layer, a black organic film, etc., is patterned to form the black matrix 1130.

White light passes through and filtered by red, green and blue color filters 1142, 1144 and 1146 disposed in a first transmission region 1150 to provide red, green and blue light, respectively. A transparent pattern 1148 is formed in a second transmission region 1160 to enhance luminance of displayed images. The white light passes through the transparent pattern 1148.

The first and second transmission regions 1150 and 1160 are alternately arranged in the first effective display region 1110 as shown in FIG. 7. The first transmission region 1150 is used to display images, and the second transmission region 1160 is used to enhance the luminance of the image.

Figure 9:
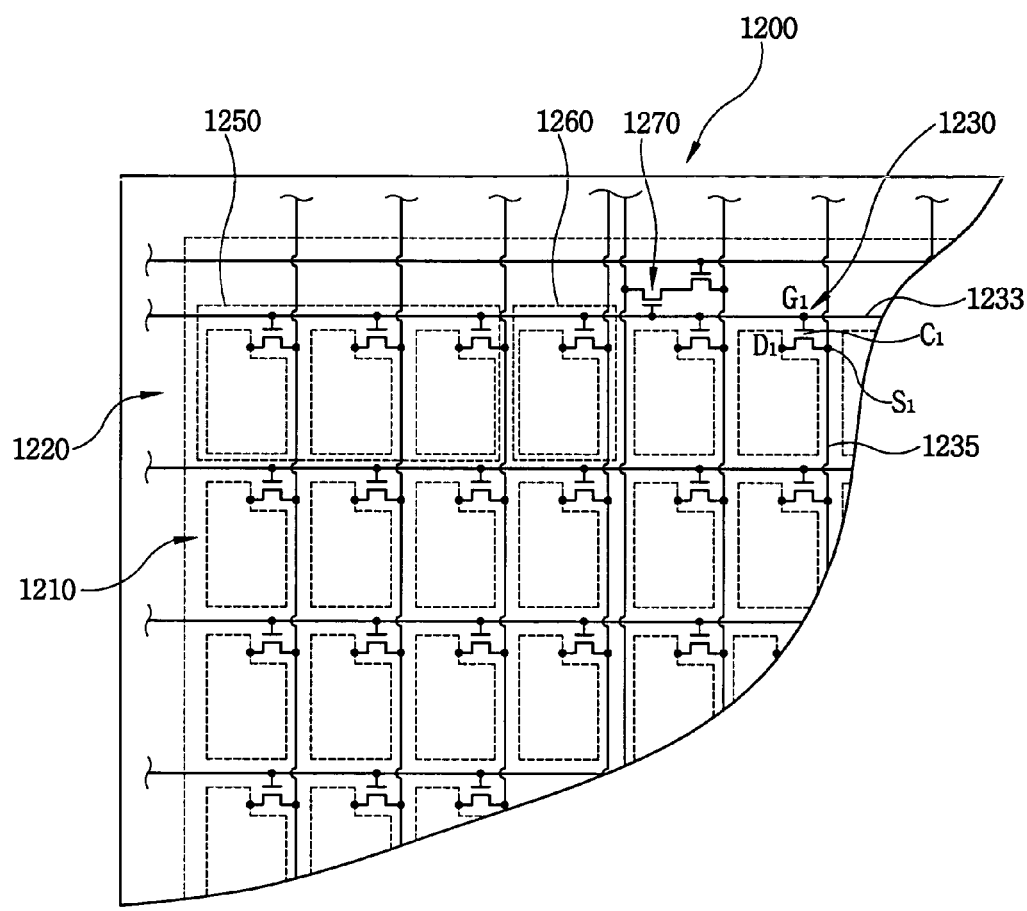
FIG. 9 is a schematic plan view showing a portion of the second substrate in FIG. 6.

FIG. 9 is a schematic plan view showing a portion of the second substrate 1200 in FIG. 6. Referring to FIG. 9, the second substrate 1200 includes a second effective display region 1210 and a second non-effective display region 1220. The second non-effective display region 1220 surrounds the second effective display region 1210. The second substrate 1200 is disposed to face the first substrate 1100. In other words, the first and second effective display regions 1110 and 1210 face each other, and the first and second non-effective display regions 1120 and 1220 face each other. The second substrate 1200 is implemented with, for example, a transparent glass substrate.

The second effective display region 1210 of the second substrate 1200 includes a first pixel region 1250 and a second pixel region 1260. The first pixel region 1250 faces the first transmission region 1150, and the second pixel region faces the second transmission region 1160. In this embodiment, the first pixel region 1250 includes three pixels corresponding to the R.G.B. color filters, and the second pixel region 1260 includes one pixel corresponding to the second transmission region 1148. The pixels of the first and second pixel regions 1250 and 1260 each have a first thin film transistor 1230 that is connected with first and second driving signal lines 1233 and 1235 for driving the first thin film transistors 1230.

The first thin film transistor 1230 includes a first gate electrode G1, a first source electrode S1, a first channel layer C1 and a first drain electrode D1. The first channel layer C1 is electrically insulated from the first gate electrode G1. The first source electrode S1 and the first drain electrode D1 are electrically connected to the first channel layer C1. The first driving signal line 1233 is electrically connected to the first gate electrode G1, and the second driving signal line 1235 is electrically connected to the first source electrode S1. A first driving signal is applied to the first gate electrode G1 via the first driving signal line 1233 to activate the channel layer C1, and a second driving signal is applied to the first source electrode S1 via the second driving signal line 1235, so that the second driving signal is transferred to the drain electrode D1 via the channel layer C1. The second substrate 1200 also includes a photo-sensor for detecting light externally provided and generating a light detect signal, which is described in detail below.

Figure 10:
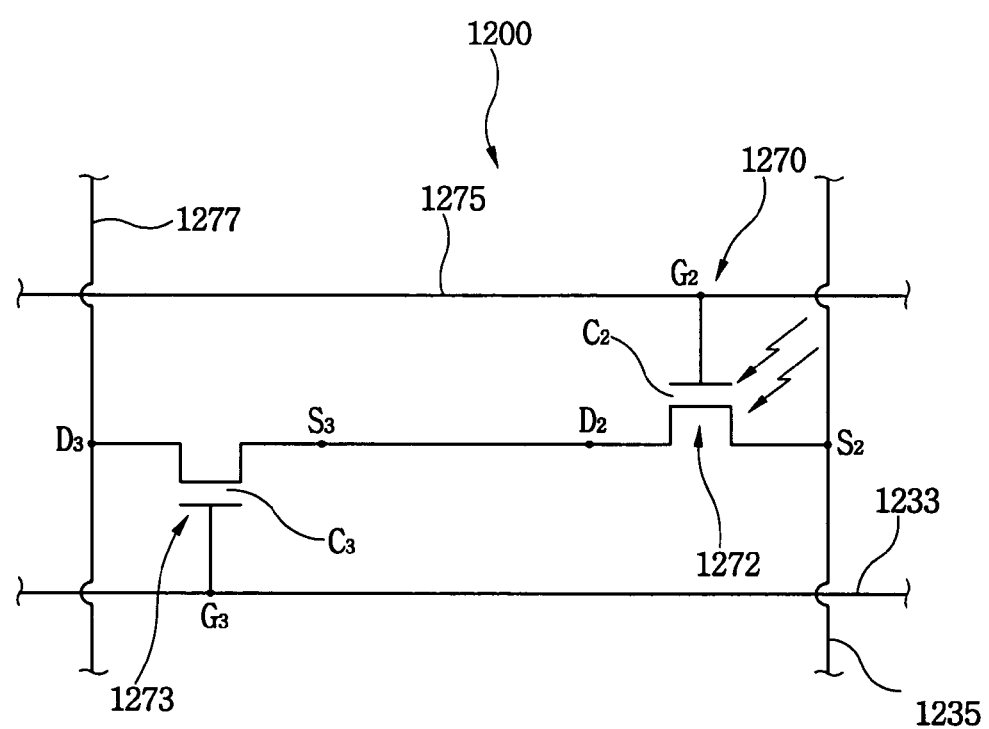
FIG. 10 is a schematic circuit diagram of the photo-sensor in FIG. 9.

FIG. 10 is a schematic circuit diagram of the photo-sensor in FIG. 9. Referring to FIGS. 9 and 10, the photo-sensor 1270 detects light, such as red, green, blue or white light, provided through the first or second transmission region 1150 or 1160 to generate the light detect signal. In this embodiment, the photo-sensor 1270 is disposed in the second pixel region 1260 of the second substrate 1200.

The photo-sensor 1270 includes a second thin film transistor 1272, a third thin film transistor 1273, a first sensor line 1275 and a second sensor line 1277. The first sensor line 1275 is disposed substantially parallel with the first driving signal line 1233, and the second sensor line 1277 is disposed substantially parallel with the second driving signal line 1235. The second and third thin film transistors 1272 and 1273 are disposed in a region defined by the first and second sensor lines 1275 and 1277 and the first and second driving signal lines 1233 and 1235.

The second thin film transistor 1272 includes a second gate electrode G2, a second source electrode S2, a second channel layer C2 and a second drain electrode D2. The second gate electrode G2 is electrically insulated from the second channel layer C2. The second source electrode S2 and the second drain electrode D2 are electrically connected to the second channel layer C2. The second gate electrode G2 is electrically connected to the first sensor line 1275, and the second source electrode S2 is electrically connected to the second driving signal line 1235. The second thin film transistor 1272 is a photo-sensitive part of the photo-sensor 1270 to detect light externally provided and generate a light detect signal. In other words, the second channel layer C2 of the second thin film transistor 1272 is activated by light externally provided. For example, a photo-transistor may be used as the second thin film transistor 1272.

The third thin film transistor 1273 includes a third gate electrode G3, a third source electrode S3, a third channel layer C3 and a third drain electrode D3. The third gate electrode G3 is electrically insulated from the third channel layer C3. The third source electrode S3 and the third drain electrode D3 are electrically connected to the third channel layer C3. The third gate electrode G3 is electrically connected to the first driving signal line 1233. The third source electrode S3 is electrically connected to the second drain electrode D2, and the third drain electrode D3 is electrically connected to the second sensor line 1277.

The photo-sensor 1270 is disposed in the second pixel region 1260 that faces the transparent pattern 1148 of the first substrate 1100 (referring to FIG. 7), so that there is no or little decrease in the amount of light provided to the photo-sensor 1270 through the transparent pattern 1148. Thus, the photo-sensor 1270 detects the light more readily and accurately.

The photo-sensor 1270 provides the light detect signal to the second sensor line 1277. The light detect signal is transferred to a signal processing module (not shown) which then outputs an image control signal. The image control signal is applied to an information processing device (not shown) that is electrically connected to the liquid crystal display device, and the information processing device outputs a new image data to the liquid crystal display device in accordance with the image control signal.

Referring again to FIG. 6, the first and second substrates 1100 and 1200 are assembled together, and the liquid crystal layer 1300 is interposed between the first and second substrates 1100 and 1200. The liquid crystal layer 1300 itself does not emit light, but the liquid crystal layer 1300 receives light and adjusts a transmittance of the light. When electric fields are applied to the liquid crystal layer 1300, an arrangement of liquid crystal molecules is changed, so that the transmittance is modulated. The display device includes electrodes disposed on the first and second substrates 1100 and 1200 to apply the electric fields. This is described in detail below.

Figure 11:
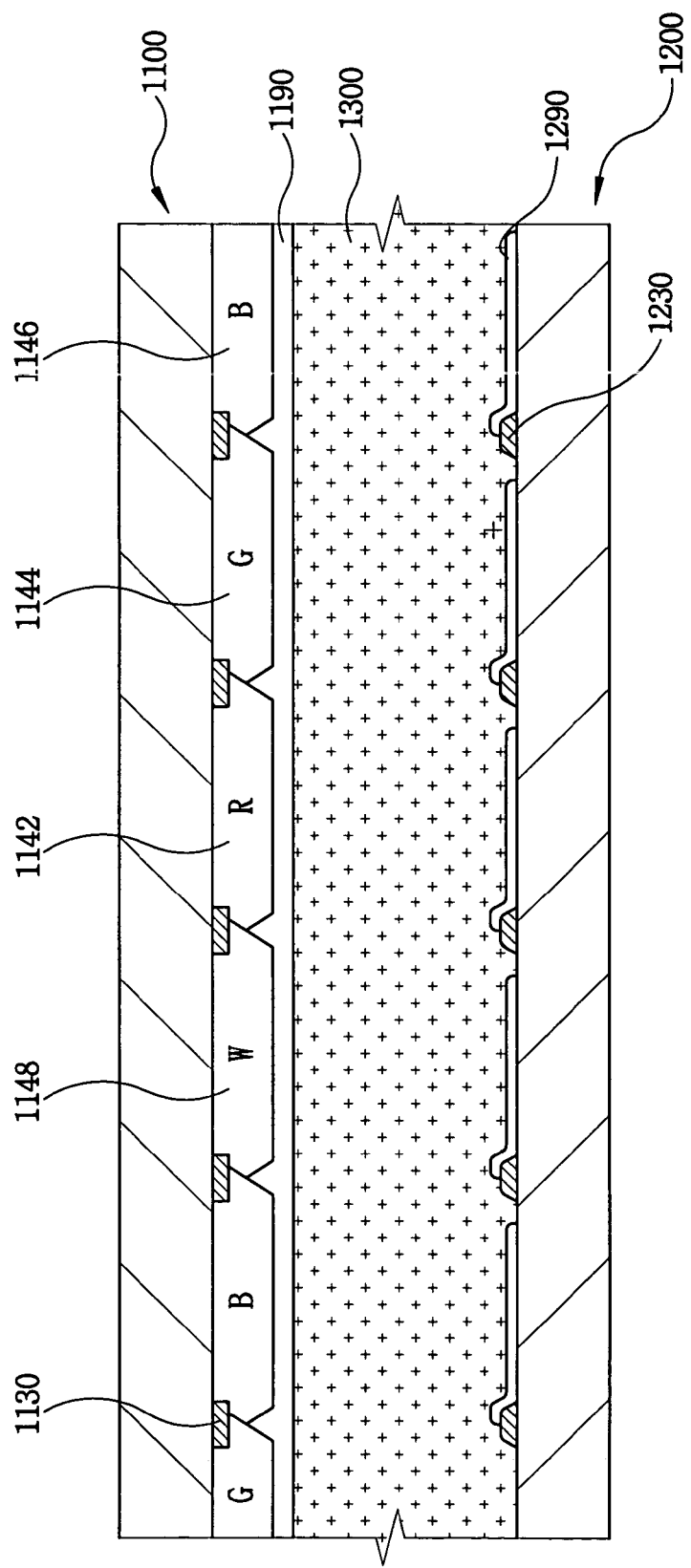
FIG. 11 is a schematic cross-sectional view of a display device according to another exemplary embodiment of the present invention.

FIG. 11 is a schematic cross-sectional view of a display device according to an exemplary embodiment of the present invention. Referring to FIGS. 9 and 11, a first electrode 1190 is formed on the first substrate 1100. The first electrode 1190 is disposed on the red, green and blue color filters 1142, 1144 and 1146 and the transparent pattern 1148. The first electrode 1190 comprises an optically transparent and electrically conductive material, for example, indium tin oxide (ITO), indium zinc oxide (IZO), etc. A film of the optically transparent and electrically conductive material is patterned to form the first electrode 1190.

A second electrode 1290 is formed on the second substrate 1200. The second electrode 1290 is disposed on the first and second pixel regions 1250 and 1260. The second electrode 1290 is electrically connected to the first drain electrode D1 of the first thin film transistor 1230. The second electrode 1290 comprises an optically transparent and electrically conductive material, for example, indium tin oxide (ITO), indium zinc oxide (IZO), etc. A film of the optically transparent and electrically conductive material is patterned to form the second electrode 1290. The liquid crystal layer 1300 is disposed between the first and second electrodes 1190 and 1290 and may include, for example, twisted nematic (TN) mode liquid crystal or vertical alignment (VA) mode liquid crystal.

Figure 12:
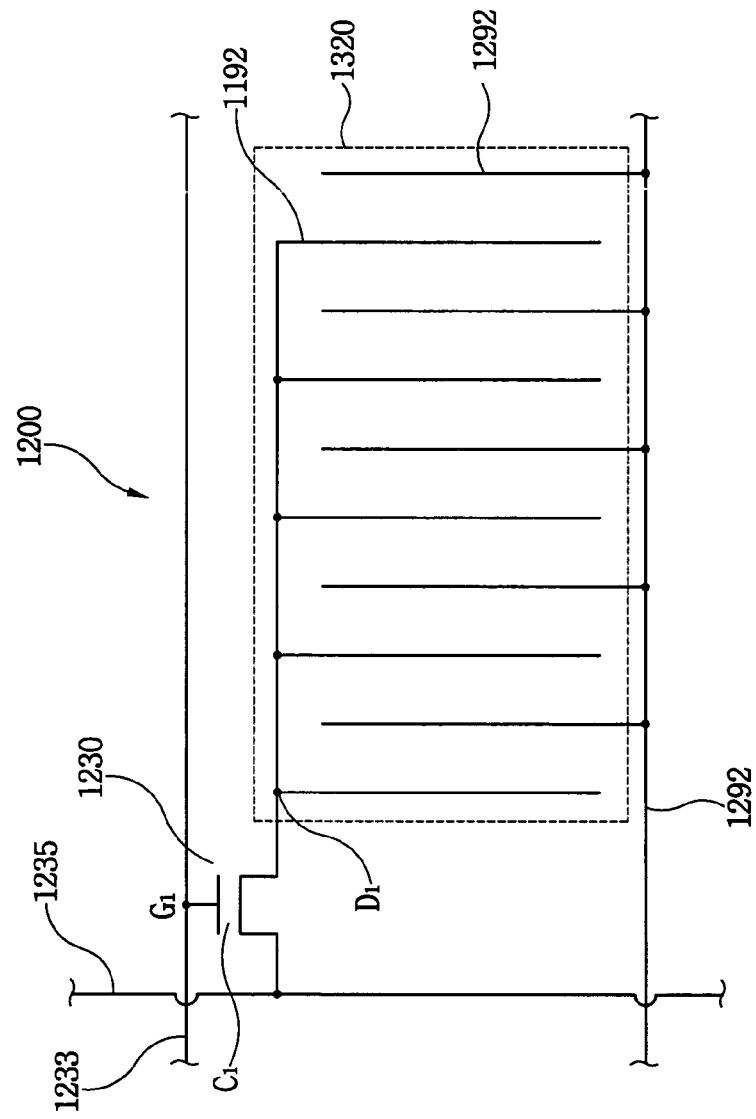
FIG. 12 is a schematic view showing a display device according to another embodiment of the present invention.

FIG. 12 is a schematic view showing a display device according to another embodiment of the present invention. The display device of the present embodiment is the same as the display device in FIG. 11 except for the first and second electrodes. Thus, the same reference numerals will be used to refer to the same or like parts as those of the display device in FIG. 11 and the explanation thereof will be omitted.

Referring to FIG. 12, both the first and second electrodes 1192 and 1292 are formed on the second substrate 1200. The first electrode 1192 is electrically connected to the drain electrode D1 of the first thin film transistor 1230. The first electrode 1192 diverges to form a branch-shape. In other words, the first electrode 1192 has a base part connected to the drain electrode D1 of the first thin film transistor 1230 and branches respectively extended from the base part in a direction substantially perpendicular to the longitudinal direction of the base part. The second electrode 1292 is formed on a same layer as the first electrode 1192. The second electrode 1292 also diverges to form a branch-shape similar to that of the first electrode 1192. The branches of the first electrode 1192 and the branches of the second electrode 1292 are disposed alternately.

The liquid crystal layer is interposed between the first and second electrodes 1192 and 1292 and may include, for example, vertical alignment mode liquid crystal or plan switching (IPS) mode liquid crystal. Since the first and second electrodes 1192 and 1292 are arranged in a horizontal direction, an electric field is produced in the horizontal direction and applied to the liquid crystal layer. Thus, the liquid crystal molecules of the liquid crystal layer are arranged in accordance with the horizontal electric field. By employing such configuration, viewing angles of the display device are widened.

Figure 13:
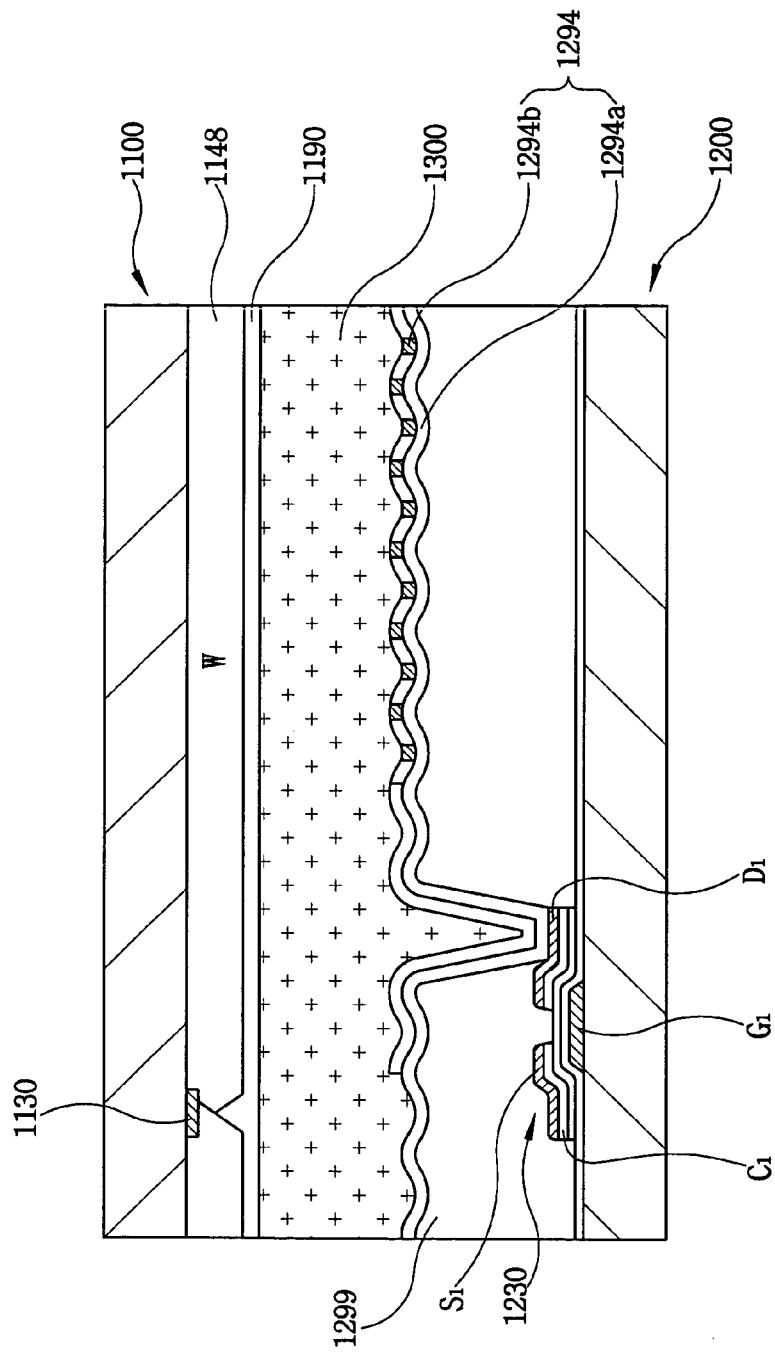
FIG. 13 is a cross-sectional view showing a display device according to another embodiment of the present invention.

FIG. 13 is a cross-sectional view showing a display device according to another embodiment of the present invention. Referring to FIG. 13, an organic insulation layer 1299 is interposed between the first thin film transistor 1230 and a second electrode 1294 on the second substrate 1200. The organic insulation layer 1299 has a thickness of, for example, a few micrometers (μm). A photosensitive layer comprising photosensitive material is patterned to form the organic insulation layer 1299. The organic insulation layer 1299 increases the distance between the second electrode 1294 and the first and second driving signal lines. Thus, parasitic capacitance between the second electrode 1294 and the first and second driving signal lines is reduced, and an opening ratio of the display device is increased to enhance the luminance.

The second electrode 1294 includes a metal electrode 1294b formed by patterning a metal film. The second electrode 1294 may include a transparent electrode 1294a as well as the metal electrode 1294b In this case, the metal electrode 1294b is formed on the transparent electrode 1294a. The metal electrode 1294b may have one or more opening portions. For example, the metal electrode 1294b may have a beehive shape.

In this embodiment, the first substrate includes the transparent pattern as well as the red, green and blue color filters, so that the amount of the light provided to the photo-sensor is not reduced. Accordingly, the luminance of the display device is enhanced.

Figure 14:
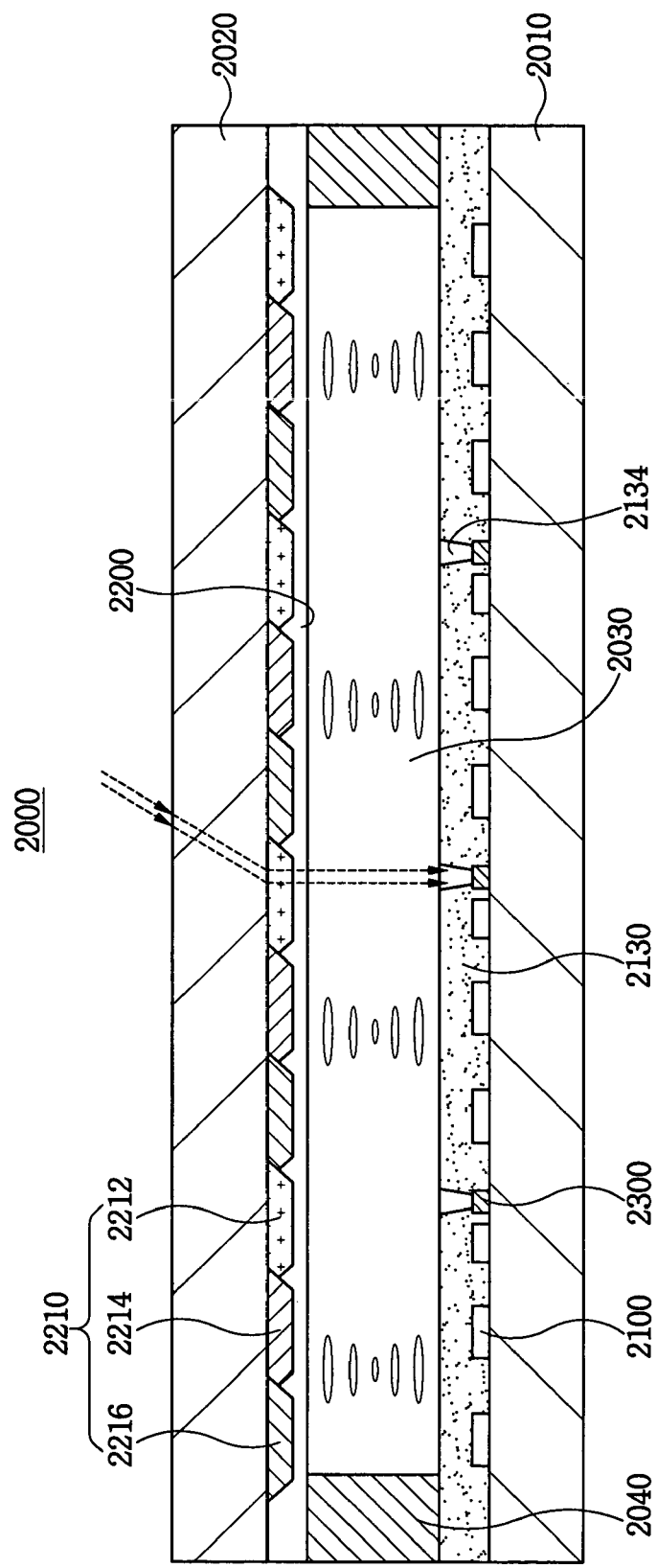
FIG. 14 is a cross-sectional view showing a display device according to another exemplary embodiment of the present invention.
Figure 15:
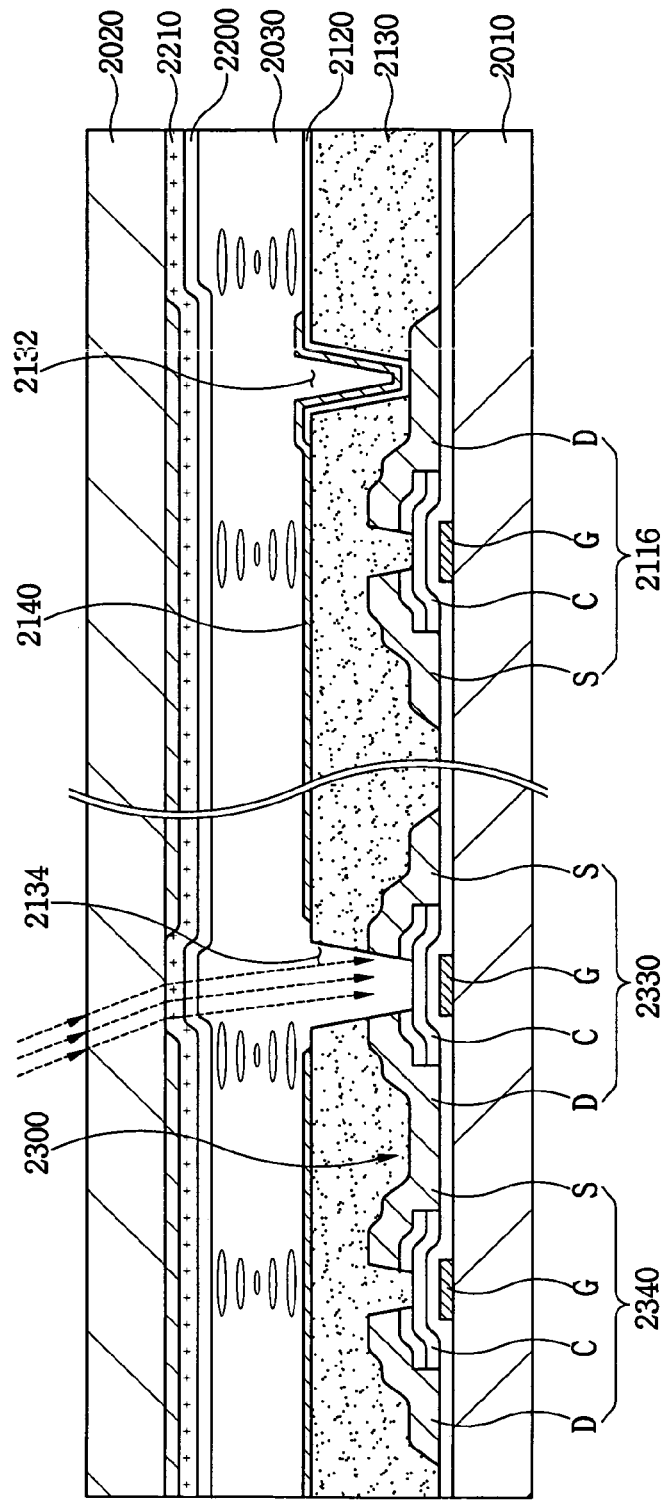
FIG. 15 is a partly enlarged cross-sectional view of the display device in FIG. 14.

FIG. 14 is a cross-sectional view showing a display device according to another exemplary embodiment of the present invention, and FIG. 15 is a partly enlarged cross-sectional view of the display device in FIG. 14. Referring to FIGS. 14 and 15, a liquid crystal display device 2000 includes a first substrate 2010, a second substrate 2020, a liquid crystal layer 2030, pixels 2100, a common electrode 2200 and a photo-sensor 2300.

The first and second substrates 2010 and 2020 face each other and are implemented with, for example, transparent glass substrates. A sealing member 2040 is disposed between the first and second substrates 2010 and 2020, such that the sealing member 2040 surrounds the edge portion of the first and second substrates 2010 and 2020. The liquid crystal layer 2030 is interposed between the first and second substrates 2010 and 2020. An arrangement of liquid crystal molecules of the liquid crystal layer 2030 is adjusted to vary the transmissivity of the liquid crystal layer 2030. The pixel 2100 and the common electrode 2200 apply electric fields to the liquid crystal layer 2030. In this embodiment, the pixel electrode 2100 is disposed on the first substrate 2010, and the common electrode 2200 is disposed on the second substrate 2020.

Figure 16:
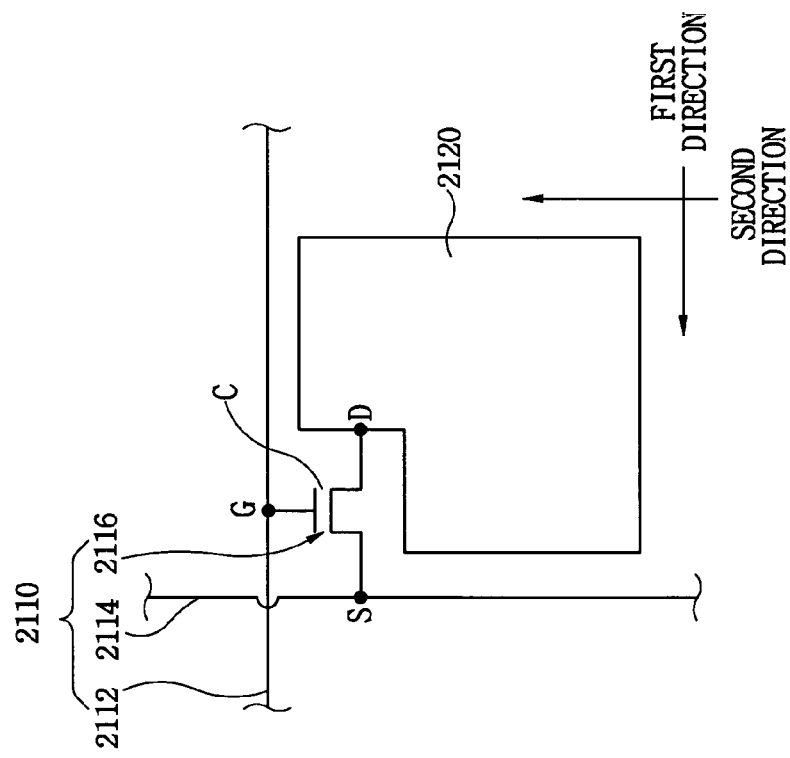
FIG. 16 is a schematic circuit diagram of the pixel in FIG. 14.

FIG. 16 is a schematic circuit diagram of the pixel in FIG. 14. Referring to FIGS. 14 to 16, a plurality of pixels 2100 are formed on the first substrate 2010 such that the pixels 2100 are arranged in a matrix form. For example, when a resolution of the display device 2000 is '1024×768', the display device 2000 displays full colors with '1024×768×3' pixels 2100 formed on the first substrate 2010. Each of the pixels 2100 includes a pixel voltage supplier 2110 and a pixel electrode 2120.

The pixel voltage supplier 2110 provides a pixel voltage to the pixel electrode 2120. The pixel voltage supplier 2110 includes a gate line 2112, a data line 2114 and a first thin film transistor 2116. The gate line 2112 is disposed in a first direction. In the display device, for example, 768 gate lines 2112 are disposed parallel with each other. The gate line 2112 comprises a metal having good electrical conductivity, for example, aluminum, aluminum alloy, etc.

The data line 2114 is electrically insulated from the gate line 2112, and the data line 2114 is disposed in a second direction that is substantially perpendicular to the first direction. In the display device, for example, '1024×3' data lines are arranged parallel with each other. The data line 2114 comprises a metal having good electrical conductivity, for example, aluminum, aluminum alloy, etc.

The first thin film transistor 2116 is disposed in a region defined by the gate line 2112 and the data line 2114. The first thin film transistor 2116 includes a gate electrode G, a source electrode S, a channel layer C and a drain electrode D. The gate electrode G of the first thin film transistor 2116 is electrically connected to the gate line 2112, and the source electrode S of the first thin film transistor 2116 is electrically connected to the data line 2114. The drain electrode D of the first thin film transistor 2115 is electrically connected to the pixel electrode 2120.

Referring again to FIGS. 15 and 16, the pixel electrode 2120 is formed on an organic layer 2130 that covers the pixel voltage supplier 2110. The pixel electrode 2120 is formed in a region surrounded by the gate line 2112 and the data line 2114. The pixel electrode 2120 is electrically connected to the drain electrode D of the first thin film transistor 2116 via a first contact hole 2132. The pixel electrode 2120 comprises a optically transparent and electrically conductive material, for example, indium tin oxide (ITO) or indium zinc oxide (IZO).

The common electrode 2200 is formed on a surface of the second substrate 2020 to face the pixel electrode 2120. The common electrode 2200 covers the surface of the second substrate 2020, and a reference voltage is applied to the common electrode 2200. The common electrode 2200 comprises a optically transparent and electrically conductive material, for example, indium tin oxide (ITO) or indium zinc oxide (IZO). A color filter 2210 is disposed between the common electrode 2200 and the second substrate 2020. The color filter 2210 includes a red color filter 2212 that transmits red color light, a green color filter 2214 that transmits green color light, and a blue color filter 2216 that transmits blue color light.

Figure 17:
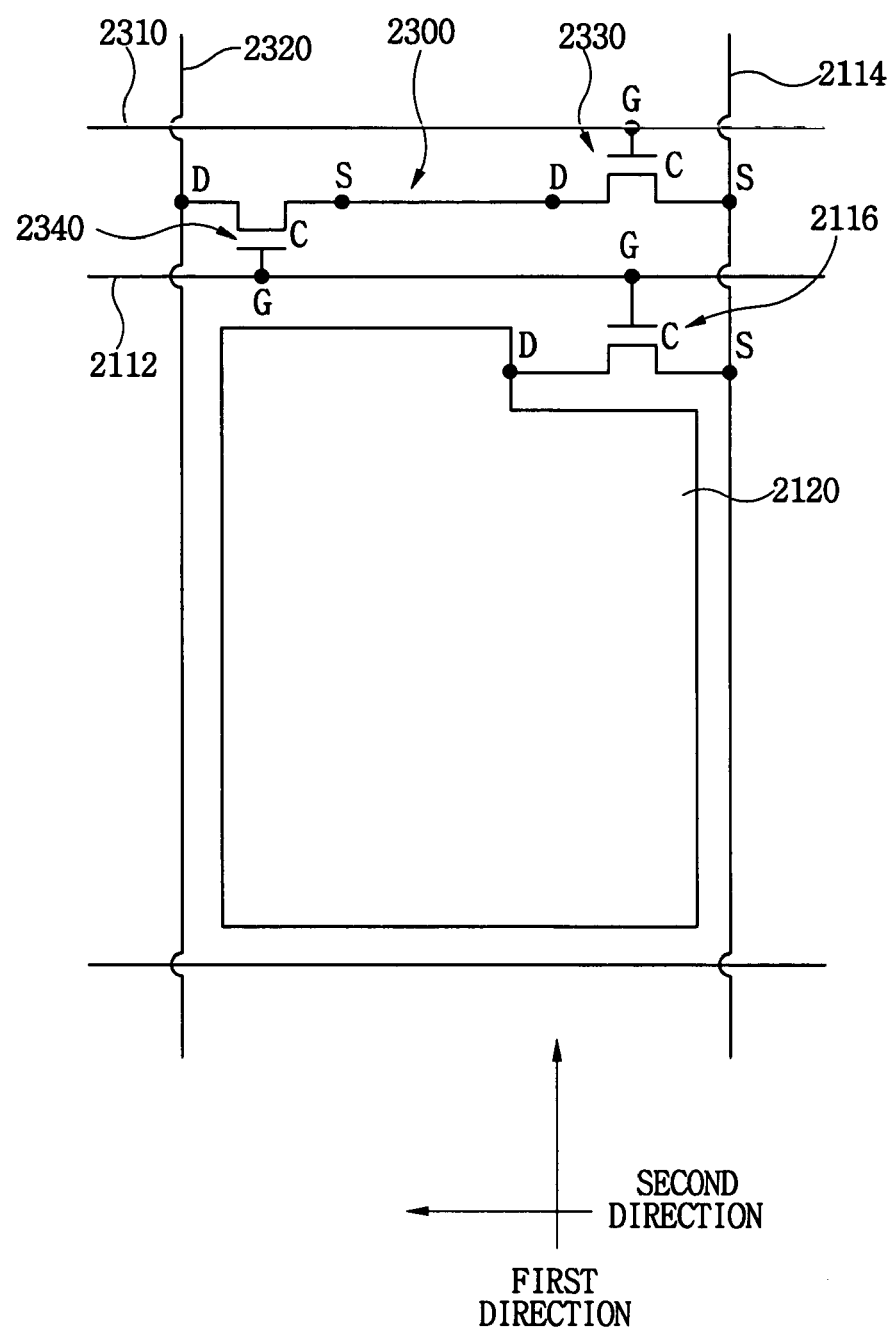
FIG. 17 is a schematic circuit diagram of a pixel including a light sensing part.

FIG. 17 is a schematic circuit diagram of a pixel including a light sensing part. Referring to FIGS. 15 and 17, the light sensing part includes the photo-sensor 2300 and first and second sensor lines 2310 and 2320, and the photo-sensor 2300 includes a second thin film transistor 2330 and a third thin film transistor 2340. The first sensor line 2310 is spaced apart from the gate line 2112 and disposed in the second direction. The first sensor line 2310 is formed in the same layer as the gate line 2112 is formed, so that the first sensor line 2310 is electrically insulated from the data line 2114.

The second sensor line 2320 is spaced apart from the data line 2114 and disposed in the first direction. The second sensor line 2320 is formed in the same layer as the data line 2114 is formed, so that the second sensor line 2320 is electrically insulated from the gate line 2112 and the first sensor line 2310.

The second and third thin film transistors 2330 and 2340 are disposed in the pixels on the first substrate 2010. For example, the second and third thin film transistors 2330 and 2340 are formed in the respective pixels along with the first thin film transistor 2116, or the second and third thin film transistors 2330 and 2340 are formed in selected ones of the pixels. In this embodiment, the second thin film transistor 2330 is formed in association with the data line 2114 and the first sensor line 2310, for example, at a region where the data line 2114 and the first sensor line 2310 are crossing each other.

The second thin film transistor 2330 includes a gate electrode G, a source electrode S, a channel layer C and a drain electrode D. The second thin film transistor 2330 is electrically connected to the first sensor line 2310 at its gate electrode G and to the data line at its source electrode S. The channel layer C is electrically insulated from the gate electrode G, and the channel layer C is disposed on the gate electrode G. The channel layer C of the second thin film transistor 2330 includes an amorphous silicon film and n+ amorphous silicon film. First and second n+ amorphous silicon films are disposed on the amorphous silicon film, such that the first and second n+ amorphous silicon films are spaced apart. When light arrives at the channel layer C of the second thin film transistor 2330, the second thin film transistor 2330 is turned on so that current flows from the source electrode S to the drain electrode D.

A first end of the source electrode S of the second thin film transistor 2330 is electrically connected to the first n+ amorphous silicon film, and a second end of the source electrode makes contact with the data line 2114. A first end of the drain electrode D of the second thin film transistor 2330 is electrically connected to the second n+ amorphous silicon film, and a second end of the source electrode is electrically connected to the source electrode S of the third thin film transistor 2340.

The third thin film transistor 2340 includes a gate electrode G, a source electrode S, a channel layer C and a drain electrode D. The gate electrode G of the third thin film transistor 2340 is electrically connected to the gate line 2112, and the source electrode S of the third thin film transistor 2340 is electrically connected to the drain electrode D of the second thin film transistor 2330. The drain electrode D of the third thin film transistor 2340 is electrically connected to the second sensor line 2310. The third thin film transistor 2340 is driven by the second thin film transistor 2330 to apply a signal containing location information to the second sensor line 2320. Thus, when light arrives at the second thin film transistor 2330, the location information is applied to the second sensor line 2320.

Referring again to FIG. 15, a second contact hole 2134 is formed at the organic layer 2130 that covers the pixel voltage supplier 2110 and the photo-sensor 2300, such that the channel layer is exposed via the second contact hole 2134. For example, the second contact hole 2134 is formed in the same process as the first contact hole 2132 is formed. In this embodiment, external light arrives at the channel layer C of the second thin film transistor 2330 without being transmitted through the organic layer 2130 owing to the second contact hole 2134. Thus, there is no or little loss in the amount of the light that is externally provided and arrives at the second thin film transistor 2330, which would otherwise have incurred due to the organic layer. As a result, sufficient light may be provided to the channel layer C of the second thin film transistor 2330.

In this embodiment, a light block layer 2140 is disposed on the organic layer 2130 and the pixel electrode 2120 ofto block the light. In other words, the light block layer 2140 is formed on the organic layer, except for the area of the second contact hole 2134. Thus, the light block layer 2140 prevents the light from being provided to the channel layers C of the first and third thin film transistors 2116 and 2340.

Figure 18:
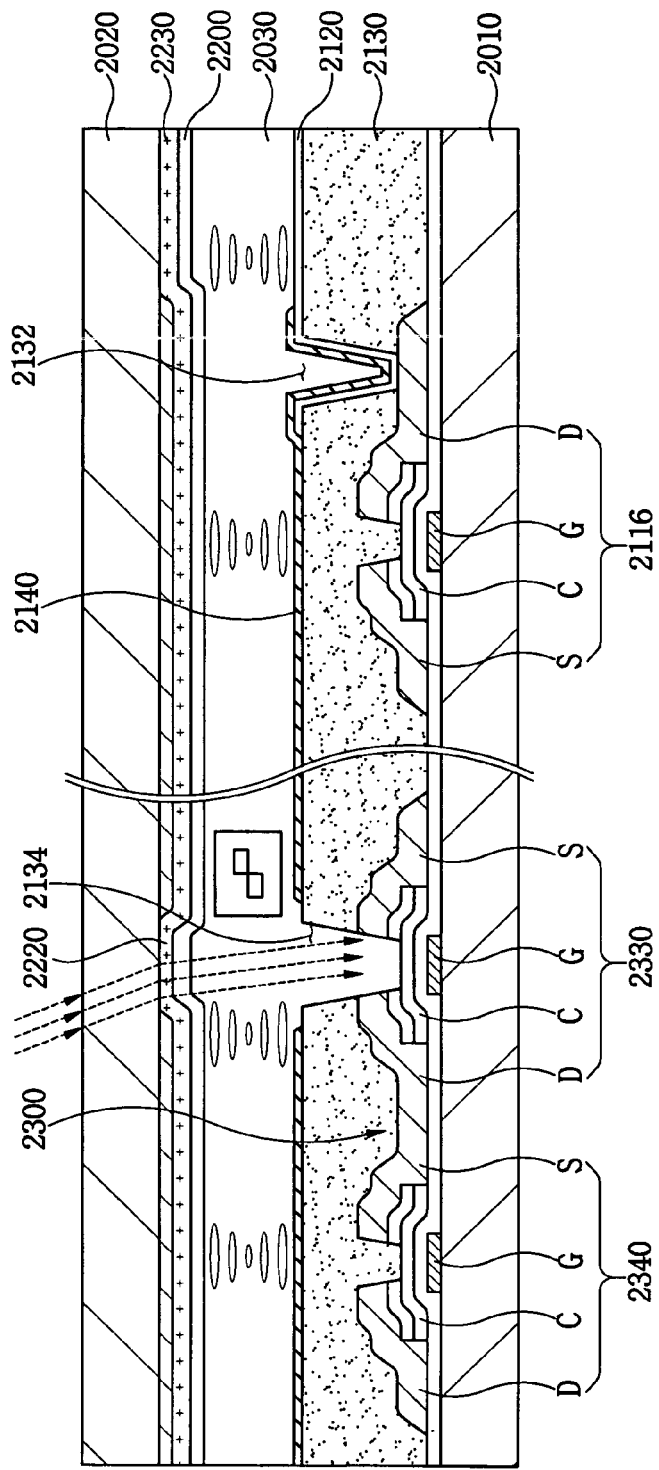
FIG. 18 is a cross-sectional view showing a display device according to another exemplary embodiment of the present invention.

FIG. 18 is a cross-sectional view showing a display device according to another exemplary embodiment of the present invention. In FIG. 18, the same parts as those shown in FIG. 15 are represented with like reference numerals and their explanation will be omitted to avoid description duplication. Referring to FIG. 18, the common electrode 2200 is formed on the surface of the second substrate 2020 to face the pixel electrode 2120. The common electrode 2200 covers the surface of the second substrate 2020, and a reference voltage is provided to the common electrode 2200. The common electrode comprises an optically transparent and electrically conductive material, for example, indium tin oxide (ITO), indium zinc oxide (IZO), etc.

The display device includes a color filter 2230 disposed between the common electrode 2200 and the second substrate 2020. The color filter 2230 includes a red color filter that transmits red color light, a green color filter that transmits green color light, and a blue color filter that transmits blue color light. The color filter 2230 includes a light inflow part 2220 disposed above the second thin film transistor 2330. In other words, the light inflow part 2220 is formed at an area of the color filter 2230 corresponding to that of the second thin film transistor 2330. The light inflow part 2220 of the color filter 2230 has a thickness smaller than that of the remaining area of the color filter 2230. The light inflow part 2220 is formed as thin as to minimize the loss of light provided to the second thin film transistor 2330 through the light inflow part 2220. As a result, the light sensing of the second thin film transistor 2330 is improved.

Color filter material comprises red, green and blue color pigment and photosensitive material. In this embodiment, a selected color pigment (i.e., red, green or blue color pigment) is coated on the surface of the second substrate 2020 to form a selected color filter thin film, and then a photosensitive layer is formed on the selected color thin film. One or more slits are formed at a portion of the photosensitive layer corresponding to the area of the second thin film transistor 2330 is partially or fully exposed to form the light inflow part 2220.

Figure 19:
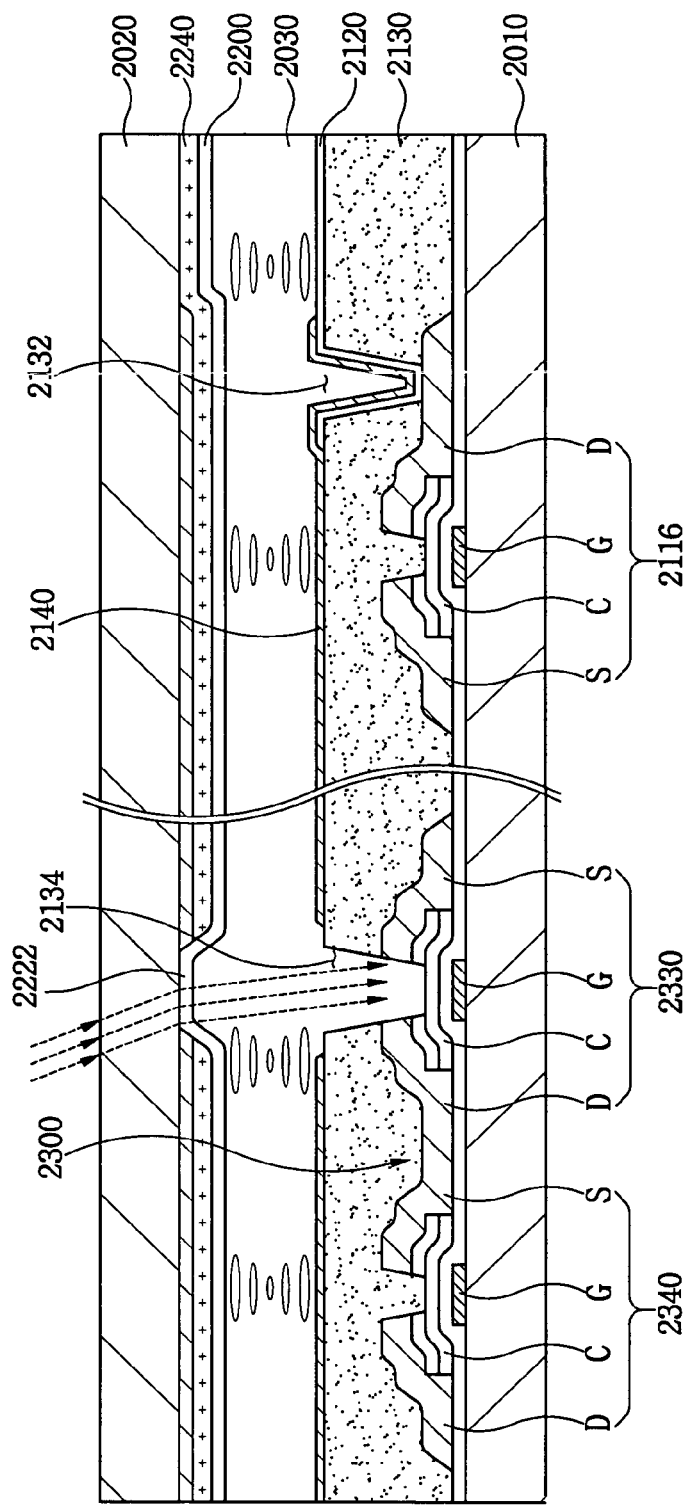
FIG. 19 is a cross-sectional view showing a display device according to another exemplary embodiment of the present invention.

FIG. 19 is a cross-sectional view showing a display device according to another exemplary embodiment of the present invention. In FIG. 19, the same parts as those shown in FIG. 18 are represented with like reference numerals and their explanation will be omitted to avoid description duplication. Referring to FIG. 19, the display device includes a color filter 2240 disposed between the common electrode 2200 and the second substrate 2020. The color filter 2240 includes a red color filter that transmits red color light, a green color filter that transmits green color light, and a blue color filter that transmits blue color light. The color filter 2240 includes a light inflow part 2222 disposed above the second thin film transistor 2330. In other words, the light inflow part 2222 is formed at an area of the color filter 2240 corresponding to that of the second thin film transistor 2330.

In this embodiment, the light inflow part 2222 is formed by removing a selected portion of the color filter 2240, and the selected portion is located corresponding to the second thin film transistor 2330. In other words, the light inflow part 2222 has an opening formed at a selected region of the color filter 2240 such that externally applied light is provided to the second thin film transistor 2330 through the opening. Thus, the light applied to the light inflow part 2222 passes though only the transparent common electrode 2200 to arrive at the channel layer C of the second thin film transistor 2330. Since the externally applied light travels through the opening and the transparent layer, there is no or little loss in the amount of the light arriving at the second thin film transistor 2330 so that the light sensing of the second thin film transistor 2330 is improved.

Figure 20:
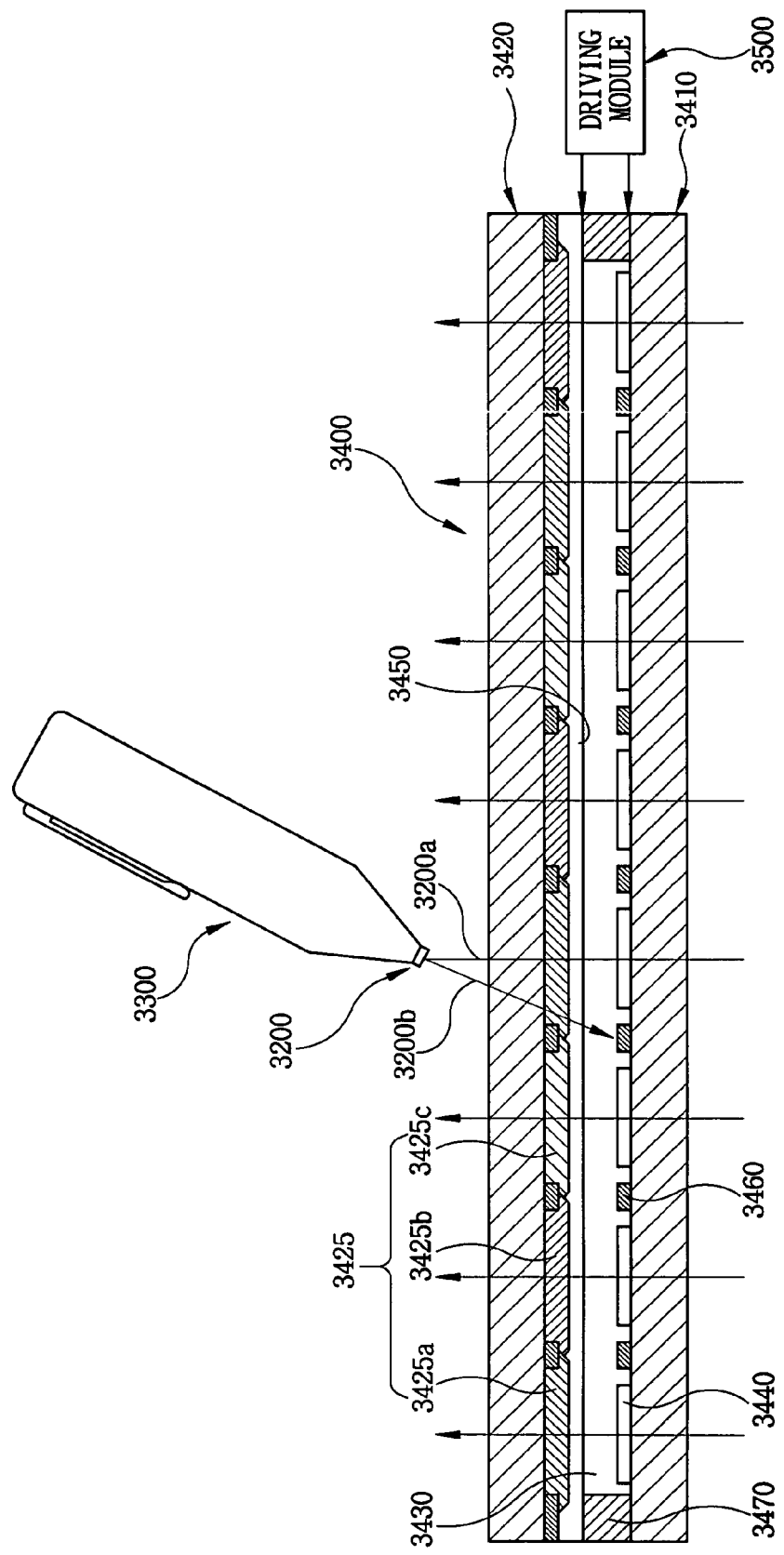
FIG. 20 is a cross-sectional view showing a display device according to another exemplary embodiment of the present invention.

FIG. 20 is a cross-sectional view showing a display device according to another exemplary embodiment of the present invention. Referring to FIG. 20, the display device includes a light pen 3300, a display panel 3400 and a driving module 3500. The light pen 3300 is implemented with one of the embodiments in FIGS. 1 to 5.

The display panel 3400 includes a first substrate 3410, a second substrate 3420, a first electrode 3440, a second electrode 3450 and a photo-sensor 3460. The first and second substrates 3410 and 3420 are disposed to face each other and are, for example, transparent glass substrates. Liquid crystal material is interposed between the first and second substrates 3410 and 3420. A sealant 3470 is disposed between the first and second substrates 3410 and 3420 along the edge of the first and second substrate 3410 and 3420 to seal the liquid crystal material.

Liquid crystal molecules of the liquid crystal material between the first and second substrates 3410 and 3420 are rearranged to change transmissivity of the light, when a different electric field is applied to the liquid crystal molecules. The first and second electrodes 3440 and 3450 are formed on the first and second substrates 3410 and 3420, respectively, to apply electric fields to the liquid crystal molecules.

Figure 21:
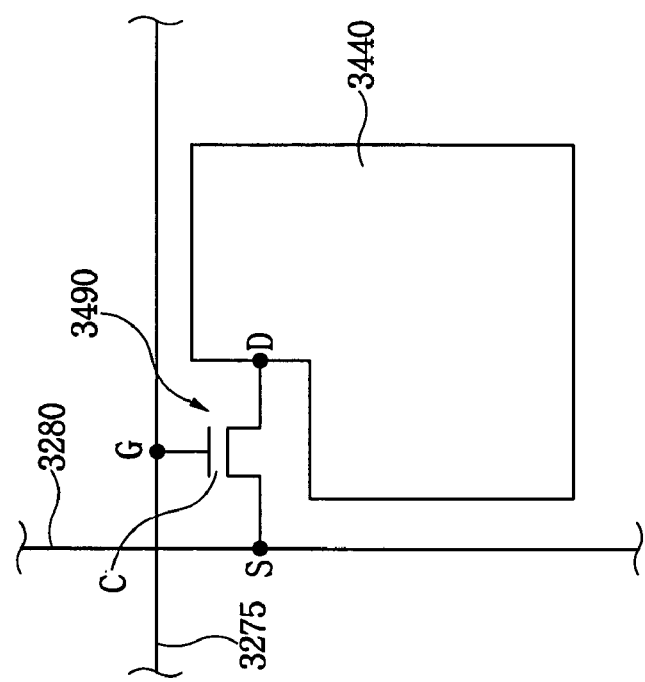
FIG. 21 is a schematic diagram of a pixel of the first substrate in FIG. 20.

FIG. 21 is a schematic diagram of a pixel of the first substrate in FIG. 20. Referring to FIGS. 20 and 21, the first electrodes 3440 are formed on the first substrate 3410. The first electrodes 3440 are arranged in a matrix form and, for example, have the number of '1024×768×3'. The first electrodes 3440 each comprise electrically conductive and optically transparent material, for example, indium tin oxide (ITO), indium zinc oxide (IZO), etc.

A first thin film transistor 3490 for applying a pixel voltage to the first electrode 3440 is formed on the first substrate 3410. The first thin film transistor 3490 includes a gate electrode G, a source electrode S, a channel layer C and a drain electrode D. The drain electrode D of the first thin film transistor 3490 is electrically connected to the first electrode 3440. The gate electrode G of the first thin film transistor 3490 of is electrically connected to a gate line 3275. The source electrode S of the first thin film transistor 3490 is electrically connected to a data line 3280.

Referring again to FIG. 20, the second electrode 3450 is formed on a surface of the second substrate 3420 to face the first electrode 3440. The second electrode 3450 covers the surface of the second substrate 3420. The second electrode 3450 comprises optically transparent and electrically conductive material, for example, indium tin oxide (ITO), indium zinc oxide (IZO), etc. A reference voltage is applied to the second electrode 3450. The color filter 3425 is interposed between the second electrode 3450 and the second substrate 3420. The color filter 3425 includes red, green and blue color filters 3425a, 3425b and 3425c that transmit red, green and blue color light, respectively.

Figure 22:
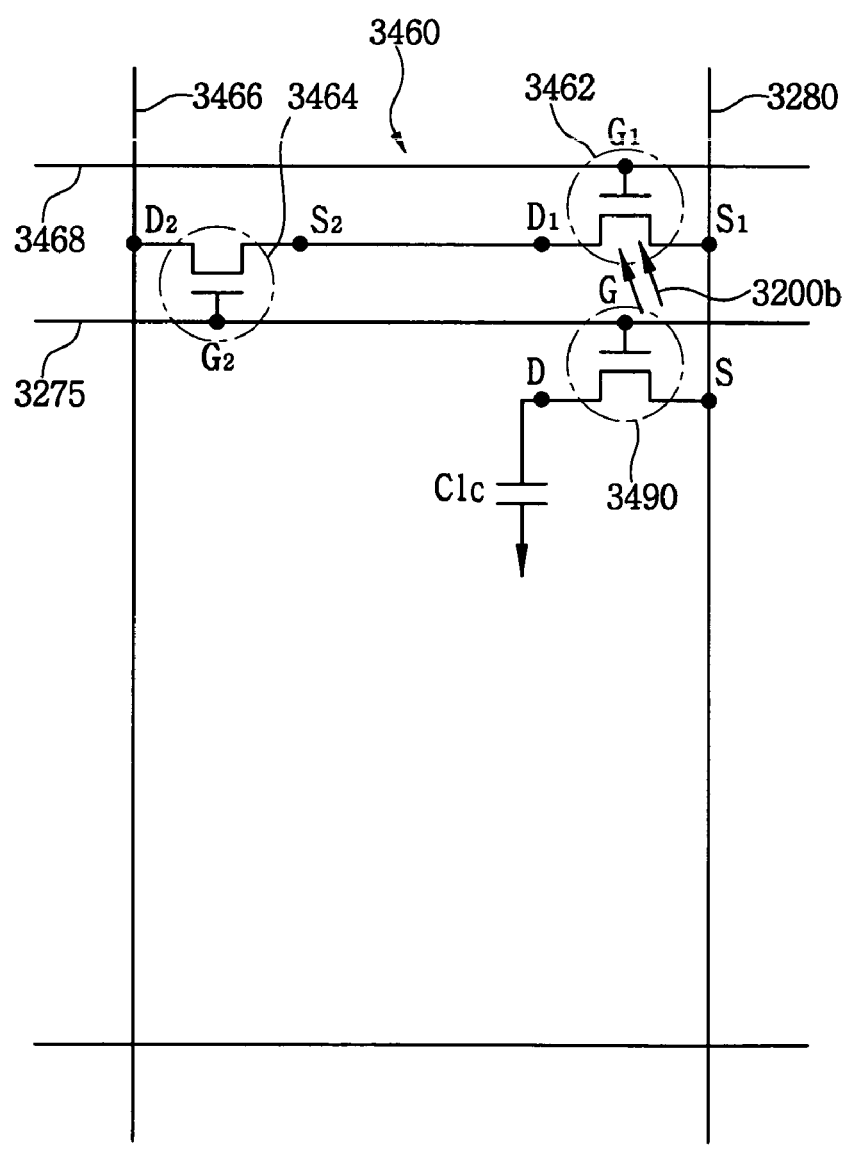
FIG. 22 is a circuit diagram of a light sensing part in FIG. 20.

FIG. 22 is a circuit diagram of a light sensing part in FIG. 20. Referring to FIGS. 20 and 22, the light sensing part includes the photo-sensor 3460 and first and second sensor lines 3466 and 3468. The photo-sensor 3460 includes a second thin film transistor 3462 and a third thin film transistor 3464. The light pen 3300 reflects a portion of image light 3200a that passes through the first electrode 3440, the liquid crystal 3430 and the second electrode 3450 to provide sensing light 3200b to the display panel 3400. The sensing light 3200b arrives at the light sensing part (i.e., the photo-sensor 3460).

The second thin film transistor 3462 is turned on in response to the sensing light 3200b. When the second thin film transistor 3462 is turned on, a first signal that is applied to the source electrode S1 of the second thin film transistor 3462 is outputted via the drain electrode D1 of the second thin film transistor 3462. The first signal contains image information, and the first signal corresponds to a data driving voltage that is applied to the pixel electrode via the first thin film transistor 3490.

When the third thin film transistor 3464 is turned on in accordance with a second signal that is applied to the gate electrode G2 via the gate line 3275, the first signal that is applied to the source electrode S2 of the third thin film transistor 3464 from the drain electrode D1 of the second thin film transistor 3462 is outputted via the drain electrode D2 of the third thin film transistor 3464. The second signal corresponds to a gate driving voltage that is applied to the gate electrode of the first thin film transistor 3490.

Figure 23:
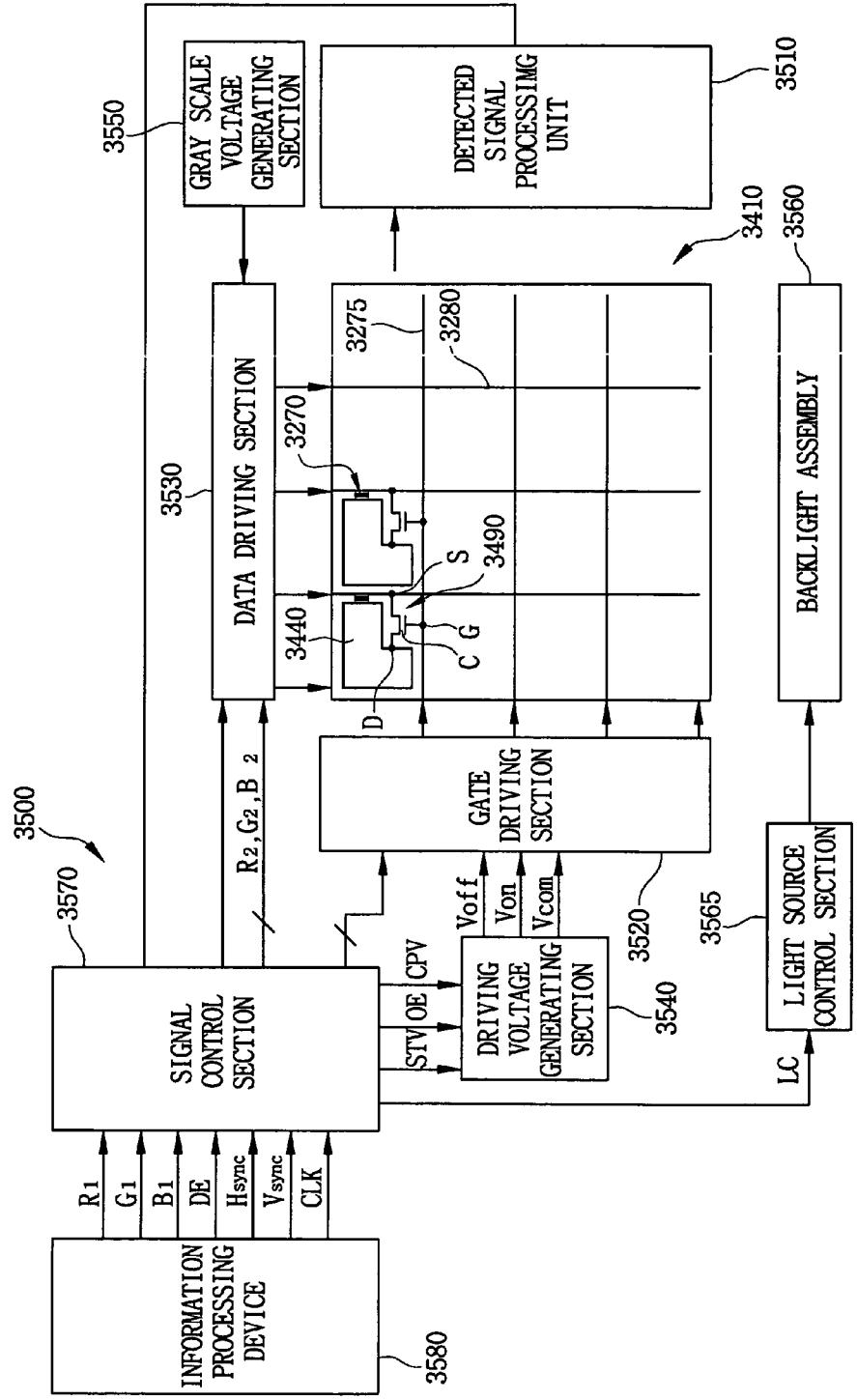
FIG. 23 is a schematic diagram illustrating the driving module in FIG. 20.

FIG. 23 is a schematic diagram illustrating the driving module in FIG. 20. Referring to FIG. 23, the driving module 3500 includes a gate driving section 3520, a data driving section 3530, a driving voltage generating section 3540 that is electrically connected to the gate driving section 3520, a gray scale voltage generating section 3550 that is electrically connected to the data driving section 3530, a light source control section 3565 that is electrically connected to a backlight assembly 3560 to control the backlight assembly 3560, a detected signal processing unit 3510 that processes the first signal provided from the light sensing part (referring to FIG. 22), and a signal control section 3570 that controls the above elements of the driving module 3500.

The first signal outputted from the light sensing part is applied to the detected signal processing unit 3510, which then generates location data representing a position where the sensing light is detected. The location data is provided to the signal control section 3570. The gate driving section 3520 is electrically connected to the respective gate lines 3275. The gate driving section 3520 applies a gate driving signal generated from the driving voltage generating section 3540 to the gate lines 3275. The gate driving signal includes a gate turn-on signal Von, a gate turn-off signal Voff and a reference voltage signal Vcom.

The data driving section 3530 is electrically connected to the respective data lines 3280. The data driving section 3530 selects a gray scale voltage generated from the gray scale voltage generating section 3550, and then applies the selected gray scale voltage to the data lines 3280.

The signal control section 3570 controls the gate driving section 3520, the driving voltage generating section 3540, the data driving section 3530 and the gray scale voltage generating section 3550. The signal control section 3570 receives a video signal from an external information processing device 3580. The video signal includes a first red gray scale signal $R_1$, a first green gray scale signal $G_1$, a first blue gray scale signal $B_1$, a vertical synchronizing signal Vsync, a horizontal synchronizing signal Hsync, a main clock signal CLK, a data enable signal DE, etc.

The signal control section 3570 coverts the first red gray scale signal $R_1$, the first green gray scale signal $G_1$, the first blue gray scale signal $B_1$ of the video signal to a second red gray scale signal $R_2$, a second green gray scale signal $G_2$ and a second blue gray scale signal $B_2$, respectively. The second red gray scale signal $R_2$, the second green gray scale signal $G_2$ and the second blue gray scale signal $B_2$ generated from the signal control section 3570 are applied to the data driving section 3530. The signal control section 3570 also applies a data control signal to the data driving section 3530. The data control signal includes a horizontal synchronization start signal indicating input of the second red gray scale signal $R_2$, the second green gray scale signal $G_2$ and the second blue gray scale signal $B_2$ at the first to last data lines, a load signal indicating input of gray scale voltage at the data lines 3280, and a data clock signal.

The signal control section 3570 applies a gate control signal to the driving voltage generating section 3540. The gate control signal includes a vertical synchronization start signal STV indicating output of a gate-on pulse signal corresponding to high section of the gate signal pulse, a gate clock signal CPV controlling output timing of the gate-on pulse, and a gate on enable signal OE applying the gate-on pulse to one channel through neighboring channel in sequence.

The data driving section 3530 receives an analog voltage corresponding to the second red gray scale signal $R_2$, the second green gray scale signal $G_2$ and the second blue gray scale signal $B_2$ from the gray scale voltage generating section 3550, and the data driving section 3530 outputs the analog voltage. The gate driving section 3520 applies the gate-on pulse to the first gate line in accordance with the data control signal from the signal control section 3570 to turn on the first thin film transistors 3490 that are connected to the first gate line. Thus, the drain electrode D of the first thin film transistor 3490 that is electrically connected to the data line 3280 applies a driving voltage to the first electrode 3440. The signal control section 3570 performs an above-described operation repeatedly during one frame. After one frame passes, a pixel voltage is applied to the first electrode 3440 of the first substrate 3410, and liquid crystal molecules of the liquid crystal are rearranged in accordance with strength of the electric fields.

Referring to FIGS. 20 and 23, the backlight assembly 3560 is disposed to face the first substrate 3410. The backlight assembly 3560 generates light passing through the liquid crystal 3430 to form the image light 3200*a*. The image light 3200*a* passes through the second substrate 3420 to be perceived by a user. The light pen 3300 operated by a user provides the sensing light 3200*b* to the display panel 3400. The light pen 3300 has a light converting part 3200 to provide the sensing light 3200*b* by reflecting the image light 3200*a*. The sensing light 3200*b* is detected by the photo-sensor 3460 disposed on the first substrate 3410 in the display panel 3400. The photo-sensor 3460 is disposed between adjacent first electrodes 3440.

When the sensing light 3200*b* from the light pen 3300 arrives at the photo-sensor 3430, the photo-sensor 3430 generates a light detect signal. The light detect signal is then provided to and processed by the detected signal processing unit 3510. The detected signal processing unit 3510 provides processed data including the location data to the signal control section 3570 which then provides the process data to the external information processing device 3580. The information processing device 3580 processes the data provided from the signal control section 3570 to output a new video signal. The new video signal is provided to the signal control section 3570, so that liquid crystal display panel displays new images.

Figure 24:
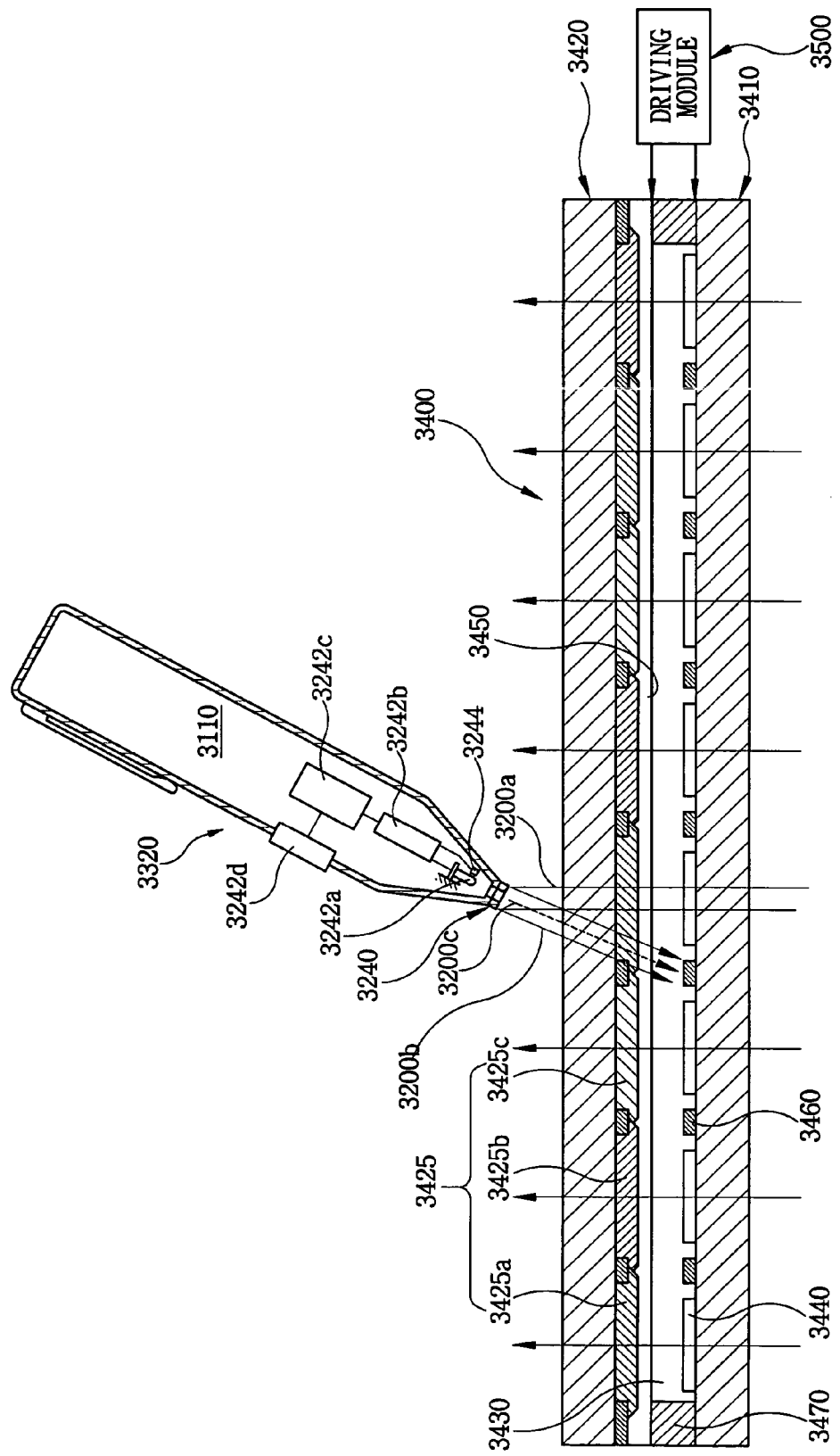
FIG. 24 is a cross-sectional view showing a display system according to another exemplary embodiment of the present invention.

FIG. 24 is a cross-sectional view showing a display system according to another exemplary embodiment of the present invention. In FIG. 24, the same parts as those shown in FIG. 20 are represented with like reference numerals and their explanation will be omitted to avoid description duplication.

The display system in this embodiment includes a light pen 3320 different from that of the embodiment in FIG. 20. The light pen 3320 has the substantially same structure as that of the embodiment in FIG. 5. Assuming that the amount of the image light provided to a light pen from a display panel is small, the amount of the sensing light provided from the light pen to the display panel is small as well. In this case, a photo-sensor in the display panel has difficulty in detecting the sensing light or fails to detect it. Such problems may be overcome by employing the light pen 3320 of this embodiment.

Referring to FIG. 24, the light pen 3320 includes a lamp 3242*a*, a control unit 3242*b*, a power supply 3242*c*, and a detector 3244. The control unit 3242*b* controls the power supply 3242*c* to provide electric power to the lamp 3242*a* in response to a detected signal generated from the detector 3244 which detects the quantity of the image light 3200*a*. For example, the amount of the light detected by the detector 3244 is smaller than a reference amount, the detector 3244 generates the detected signal so that the lamp 3242*a* generates a second sensing light 3200*c* through a light converting part 3240 of the light pen 3320. Thus, in this case, the light pen 3320 generates the second sensing light 3200*c* as well as the first sensing light 3200*b* which are sensed by the light sensing part in the display panel 3400. Accordingly, the display system having the light pen 3320 properly operates even when the amount of the first sensing light 3200*b* is small. The display system of this embodiment is used for, for example, a normally black mode type liquid crystal display device.

Figure 25:
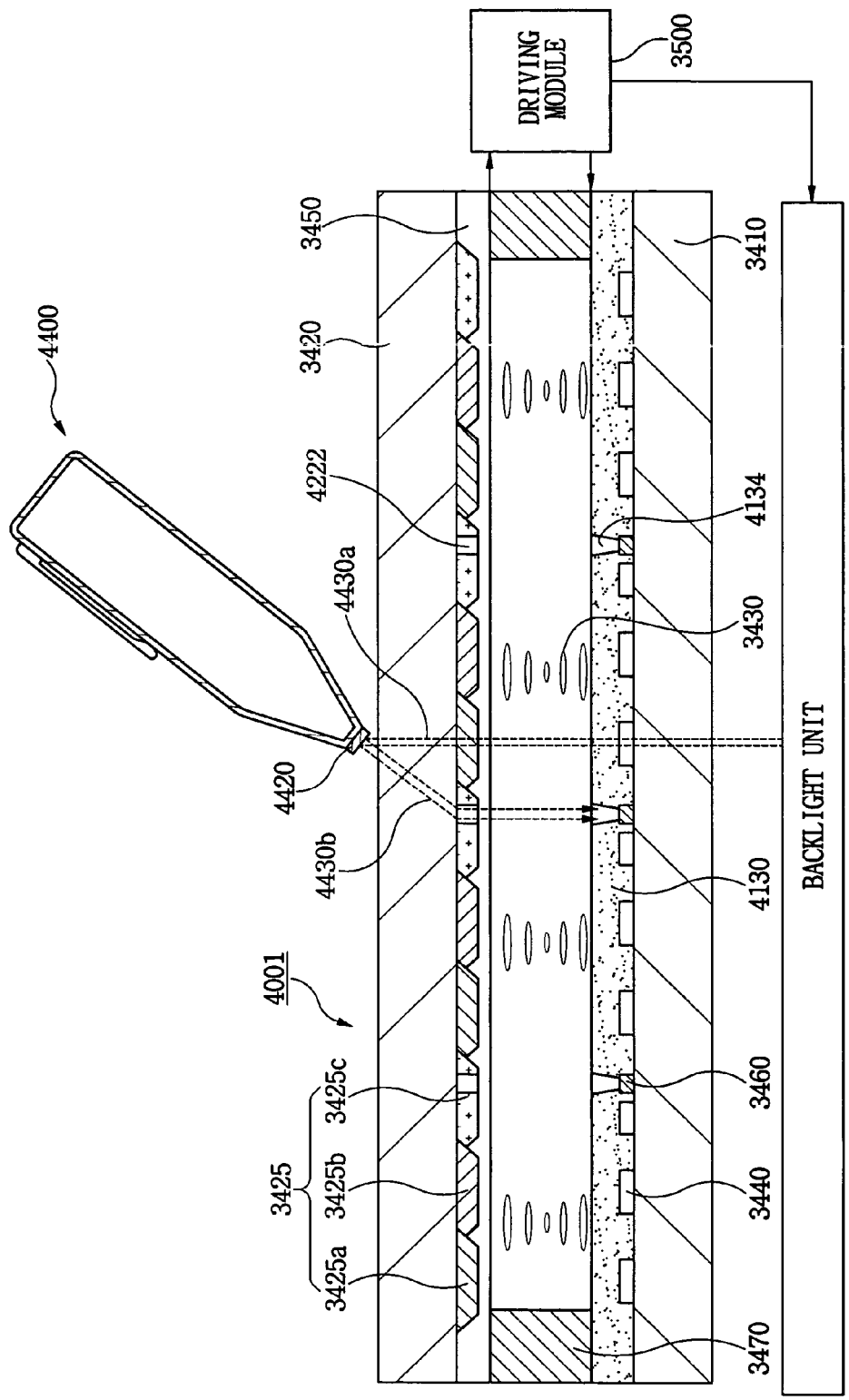
FIG. 25 is a cross-sectional view showing a display system according to another exemplary embodiment of the present invention.

FIG. 25 is a cross-sectional view showing a display system according to another exemplary embodiment of the present invention. In FIG. 25, the same parts as those shown in FIG. 20 are represented with like reference numerals and their explanation will be omitted to avoid description duplication. Referring to FIG. 25, the display system includes a light pen 4400 having a light converting part 4420 that receives image light 4430*a* and provides sensing light 4430*b* from and to a display panel 4001. The light pen 4400 in this embodiment may be implemented with one of the light pens described above.

The display panel 4001 includes an organic layer formed on the first substrate 3410, the first electrodes 3440 and the photo-sensors 3460. The organic layer 4130 has contact holes 4134 each of which is formed on a corresponding one of the photo-sensors 3460, so that the top of the respective photo-sensors 3460 is exposed to directly receive the sensing light 4430*b* from the light pen 4400.

The display panel 4001 has the color filter 3425 formed on the second substrate 3420. The color filter 3425 has light inflow parts 4222 formed at selected positions of the color filter 3425. For example, the light inflow parts 4222 are each an opening formed at a position corresponding to the photo-sensor 3460. The light inflow parts 4222 are each disposed to be aligned with the corresponding contact hole 4134 and the corresponding photo-sensor 3460, so that the sensing light 4430*b* passes through the light inflow part 4222 and the contact hole 4134 to reach the photo-sensor 3460.

By forming the contact holes 4134 and the light inflow parts 4222 in the display panel 4001, there is no or little loss in the amount of the sensing light provided to the photo-sensor 3460 from the light pen 4400. Accordingly, the photo-sensors 3460 properly and accurately sense the sensing light 4430b.

Figure 26:
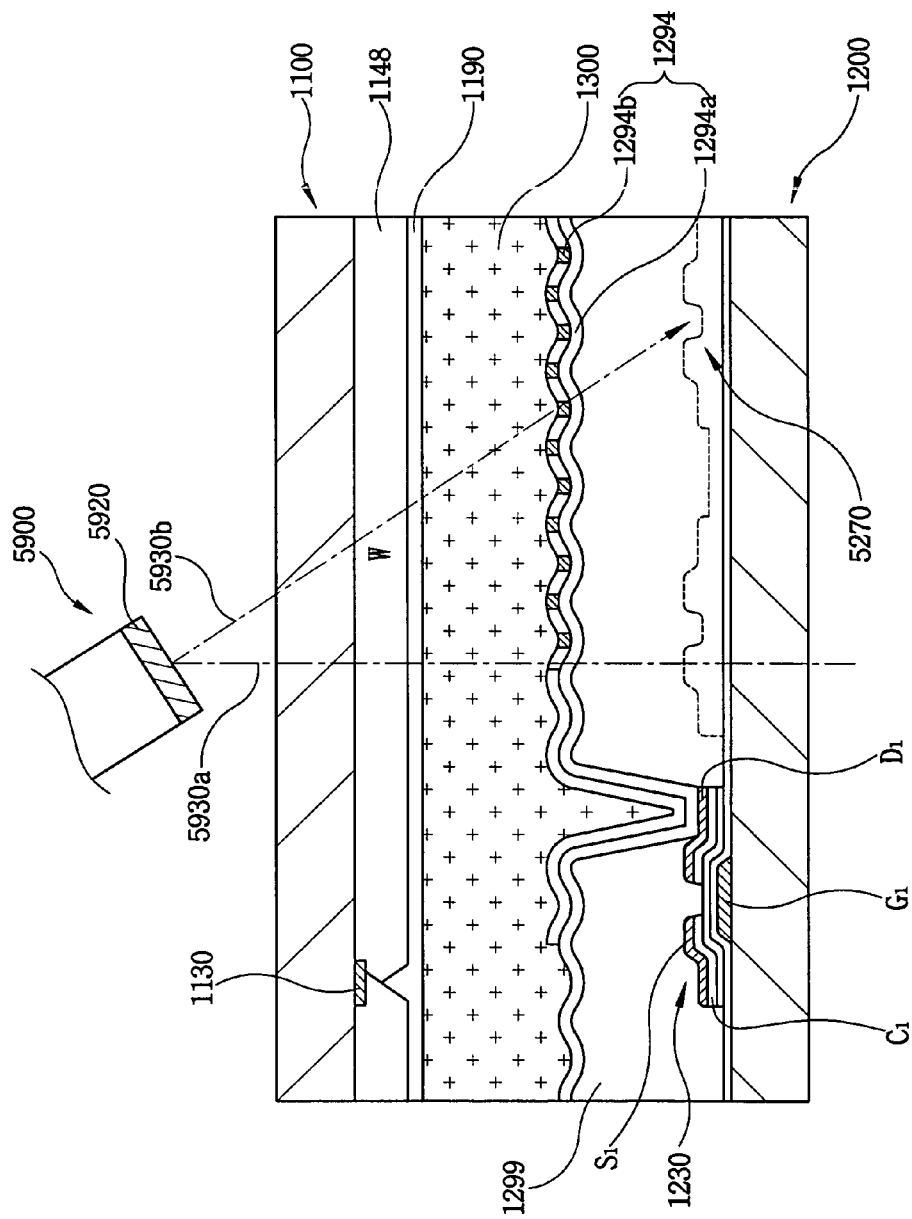
FIG. 26 is a cross-sectional view showing a display system according to another exemplary embodiment of the present invention.

FIG. 26 is a cross-sectional view showing a display system according to another exemplary embodiment of the present invention. In FIG. 26, the same parts as those shown in FIG. 13 are represented with like reference numerals and their explanation will be omitted to avoid description duplication. Referring to FIG. 26, the display system includes a light pen 5900 including a light converting part 5920 that reflects image light 5930a to provide sensing light 5930b to the display panel. The sensing light 5930b travels through the display panel to reach a photo-sensor 5270 which then generates a light detect signal in response to its detection of the sensing light 5930b.

The photo-sensor 5270 may be formed on the substrate 1200 at locations under the red, green, blue or white color filter. In this embodiment, the photo-sensor 5270 is disposed at the location corresponding to the white color filter W (or the transparent pattern 1148). Since the photo-sensor 5270 is disposed under the white color filter, the light converting part 5920 of the light pen 5900 reflects the white light to provide the sending light 5930b and the sensing light 5930b passes through the white color filter W. Accordingly, the sensing light 5930b is more effectively provided to the photo-sensor 5270 without a decrease in the amount of the sensing light 5930b.

Also, in this embodiment, the sensing light 5930b passes through one or more openings of the metal electrode 1294b so that no decrease is incurred in the amount of the sensing light provided to the photo-sensor 5270.

Figure 27:
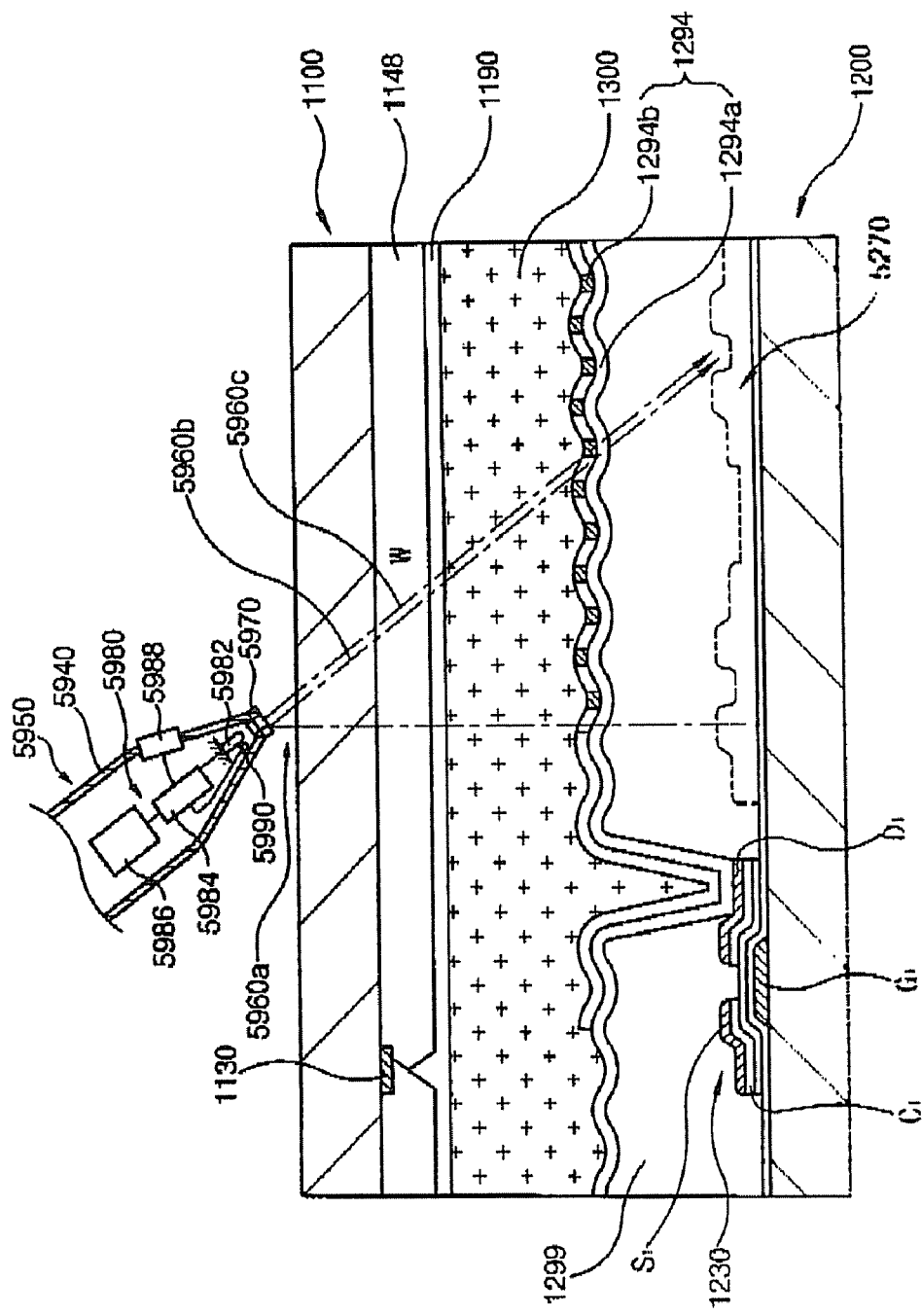
FIG. 27 is a cross-sectional view showing a display system according to another exemplary embodiment of the present invention.

FIG. 27 is a cross-sectional view showing a display system according to another exemplary embodiment of the present invention. In FIG. 27, the same parts as those shown in FIG. 26 are represented with like reference numerals and their explanation will be omitted to avoid description duplication. In this embodiment, the display system includes a light pen 5950 for providing sensing light to the display panel. The light pen 5950 has the substantially same structure as that of the embodiment in FIG. 5. The light pen 5950 receives the image light 5960a from the display panel and provides first and second sensing light 5960b and 5960c to the display panel, in which the photo-sensor 5270 detects the first and second sensing light.

In this embodiment, the light pen 5950 includes a light converting part 5970, a light generating module 5980, and a detector 5990. The light converting part 5970 is disposed at the body 5960. The light converting part 5970 reflects the image light 5960a (i.e., the red, green, blue or white light) from the display panel to provide the first sensing light 5960b. The detector 5990 detects the amount of the image light 5960a and generates a detected signal to the light generating module 5980. The detected signal contains information of the amount of the image light 5960a. The detector 5990 converts an analog signal of the image light 5960a into a digital signal. For example, a phototransistor or a photodiode may be used as the detector 5990.

The light generating module 5980 includes a light source 5982, a control unit 5984, a power supply 5986 and a switch 5988. For example, a light emitting diode (LED) is used as the light source 5982. The light source 5982 emits a second sensing light 5960c. The power supply 5986 provides electric power to the light source 5982. The control unit 5984 controls the light source 5982 to be turned on or off. The control unit 5984 compares the detected signal provided from the detector 5990 with a reference signal that is previously set. When the detected signal is smaller than the reference signal (i.e., the amount of the image light 5960a is smaller than a predetermined reference amount), the power supply 5986 provides the electric power to the light source 5982, so that the light source 5982 generates the second sensing light 5960c to the display panel. The light converting part 5970, for example, has a hole though which the second sensing light 5960c passes.

In this embodiment, since the light pen 5950 provides the second sending light 5960c in addition to the first sensing light 5960b in case that the amount of the image light 5960a is relatively small, the photo-sensor 5270 is prevented from malfunctioning due to a decrease in the amount of the sensing light provided from the light pen 5950.

Having described the exemplary embodiments of the display system according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A data input device interfacing with an image display device using light, comprising:
   a body including a detector; and
   a light converting part disposed at a selected portion of the body, the light converting part receiving image light provided from the image display device and converting the image light into first sensing light detected by the image display device,
   wherein the detector detects an amount of the image light arriving at the light converting part and generates a detect signal in response to the detected amount of the light; and
   wherein the light converting part provides a second sensing light to the image display device when the detect signal is less than a reference data.

2. The data input device of claim 1, wherein the light converting part includes a surface with a recession, the surface with the recession reflecting the image light and condensing the reflected image light to form the first sensing light.

3. The data input device of claim 1, further including a scratch preventing part disposed on a surface of the light converting part, the scratch preventing part having a round shape and being in contact with the image display device when performing data input.

4. The data input device of claim 1, further including a diffused reflection part formed on a surface of the light converting part, the diffused reflection part diffusively reflecting the image light to form the first sensing light.

5. The data input device of claim 4, wherein the diffused reflection part includes an embossed pattern formed on the surface of the light converting part.

6. The data input device of claim 1, wherein the body further includes:
   a light generating module generating the second sensing light when the detect signal provided from the detector is less than a reference data.

7. The data input device of claim 6, wherein the light converting part includes a hole through which the second sensing light passes from the light generating module to the image display device.

8. The data input device of claim 6, wherein the light generating module includes:
   a control unit to generate a control signal in response to the detect signal provided from the detector;

a power supply to supply electric power in response to the control signal from the control unit; and a light source to generate the second sensing light by receiving the electric power from the power supply.

9. A display system to display images, comprising:
a display panel including:
   a first substrate on which first electrodes are formed;
   a second substrate on which a second electrode is formed; and
   a liquid crystal layer disposed between the first and second substrates, optical properties of the liquid crystal layer varying in association with changes of electric field formed between the first and second electrodes; and
a data input device interfacing with the display panel using light, the data input device including
   a light converting part receiving image light provided from the display panel, and converting the image light into first sensing light detected by the display panel; and
   a detector detecting an amount of the image light arriving at the light converting part, and generating a detect signal in response to the detected amount of the light;
   wherein the light converting part provides a second sensing light to the image display device when the detect signal is less than a reference data.

10. The display system of claim 9, wherein the light converting part includes a surface with a recession, the surface with the recession reflecting the image light and condensing the reflected image light to form the first sensing light.

11. The display system of claim 9, wherein the data input device further including a scratch preventing part disposed on a surface of the light converting part, the scratch preventing part having a round shape and being in contact with the display panel when performing data input.

12. The display system of claim 9, wherein the data input device further including a diffused reflection part formed on a surface of the light converting part, the diffused reflection part diffusively reflecting the image light to form the first sensing light.

13. The display system of claim 9, wherein the data input device further includes
   a light generating module generating the second sensing light when the detect signal provided from the detector is less than a reference data.

14. The display system of claim 9, wherein the display panel includes a light sensing part to detect the first sensing light provided from the data input device to generate a light detect signal, the light sensing part being disposed on the first substrate and between the first electrodes.

15. The display system of claim 14, further including a driving module to drive the display panel to display new images in response to the light detect signal provided from the light sensing part.

16. The display system of claim 15, wherein the light sensing part includes a photo-sensor electrically connected with sensor lines of the display panel, the photo-sensor detecting the first sensing light to generate the light detect signal to one of the sensor lines.

17. The display system of claim 14, wherein the display panel includes:
   a first transmission region formed on the second substrate, the first transmission region having color filters to transmit color light; and
   a second transmission region formed on the second substrate, the second transmission region being transparent to transmit white light,
   wherein the light sensing part is disposed on the first substrate at a location corresponding to the second transmission region, the light sensing part detecting the first sensing light provided from the data input device through the second transmission region.

18. The display system of claim 17, wherein the first and second transmission regions are formed in a matrix form on the second substrate.

19. The display system of claim 17, wherein a first transistor is formed on the first substrate at a location corresponding to the first transmission region, the first transistor being electrically connected to corresponding one of the first electrodes.

20. The display system of claim 19, wherein the light sensing part includes:
   a second transistor to detect the first sensing light from the data input device, the second transistor having a conduction path connected between a first driving signal line and a first sensor line of the display panel, the conduction path being controlled by a signal provided from a second sensor line of the display panel; and
   a third transistor disposed between the second transistor and the first sensor line, the third transistor transferring a light detect signal from the second transistor to the first sensor line in response to a signal provided from a second driving signal line of the display panel.

21. The display system of claim 14, wherein the display panel includes an organic layer disposed between the first electrodes and the first substrate.

22. The display system of claim 21, wherein the first electrodes are formed on the organic layer and each of the first electrodes include a metal electrode having openings through which the first sensing light passes.

23. The display system of claim 22, wherein the first electrodes each include a transparent electrode formed between the metal electrode and the organic layer.

24. The display system of claim 21, wherein the organic layer has openings each formed at a location corresponding to the light sensing part, so that the first sensing light is provided to the light sensing part through the openings.

25. The display system of claim 24, wherein the light sensing part includes a second transistor to detect the first sensing light, the openings of the organic layer being each formed to expose a channel layer of the second transistor.

26. The display system of claim 14, wherein the display panel includes a color filter layer formed between the second substrate and the second electrode, the color filter layer having a light inflow part through which the first sensing light passes.

27. The display system of claim 26, wherein the light inflow part is disposed at a location corresponding to the light sensing part, so that the first sending light is provided to the light sensing part through the light inflow part.

28. The display system of claim 27, wherein the light inflow part is an opening formed in the color filter layer at the location corresponding to the light sensing part.

29. The display system of claim 26, wherein the light inflow part has a thickness smaller than a thickness of the color filter layer other than the light inflow part.

* * * * *